(12) United States Patent
Saito et al.

(10) Patent No.: US 6,707,899 B2
(45) Date of Patent: Mar. 16, 2004

(54) COMPUTER-TELEPHONE INTEGRATED SYSTEM, SWITCHING CONTROL APPARATUS AND STORAGE MEDIUM

(75) Inventors: Takahiro Saito, Kawasaki (JP); Yasufumi Nagayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/265,347

(22) Filed: Mar. 9, 1999

(65) Prior Publication Data

US 2002/0057777 A1 May 16, 2002

(30) Foreign Application Priority Data

Mar. 9, 1998 (JP) ............................................. 10-056852

(51) Int. Cl.[7] .......................... H04M 3/42; H04M 7/00; H04M 3/00
(52) U.S. Cl. ............................ 379/202.01; 379/201.02; 379/220.01; 379/242
(58) Field of Search .................................. 379/201, 220, 379/202, 242, 202.01, 201.02, 220.01

(56) References Cited

U.S. PATENT DOCUMENTS

| | | | | |
|---|---|---|---|---|
| 5,642,410 A | * | 6/1997 | Walsh et al. ................. | 379/201 |
| 5,649,005 A | * | 7/1997 | Lynch et al. ................. | 379/242 |
| 5,655,014 A | * | 8/1997 | Walsh et al. ............ | 379/201.02 |
| 5,655,015 A | * | 8/1997 | Walsh et al. ............ | 379/201.02 |
| 6,047,054 A | * | 4/2000 | Bayless et al. ......... | 379/202.01 |
| 6,094,479 A | * | 7/2000 | Lindeberg et al. ...... | 379/220.01 |

* cited by examiner

Primary Examiner—Ahmad F. Matar
Assistant Examiner—Thjuan P Knowlin
(74) Attorney, Agent, or Firm—Katten Muchin Zavis Rosenman

(57) ABSTRACT

A computer-telephone integrated system includes a switch engine carrying out a switching control, devices coupled to the switch engine, a service request part requesting a telephone switching service with respect to the switch engine, and a service request process/call information notifying part providing an interface function between the switch engine and the service request part. The service request process/call information notifying part processes a switching service request from the service request part to the switch engine, and notifies call information related to the devices and the switch engine from the switching engine to the service request part. The call information includes information related to states of the devices and information related to a connection of a path between the switch engine and the devices.

18 Claims, 29 Drawing Sheets

F I G. 2

| CONNECTION STATE | SUMMARY |
|---|---|
| Null State | Call and device are not connected, physically or logically. |
| Connected State | Call and device are connected both physically and logically. When device originated call, transmission procedure with respect to destination is completed. When device makes call reception, response is retuned with respect to call. |
| Initiated State | Switching system urges user to cairy out procedure necessary for call origination. |
| Alerting State | call is calling device, and includes following 3 modes: Ringing Mode : Device excluding offered device & distribution device is called. offered Mode : Call received by offered device & instruction of application with respect to received call awaited. Entering Distribution Mode : Call received by distribution device |
| Fail State | Normal state transition of connection foiled for same reason. |
| Hold State | Call and device are logically connected but are physically connected. |
| Queued STate | Occurrence of kind of change or action awaited. |

D1~D3 : DEVICE
C1, C2 : CONNECTION

FIG. 7
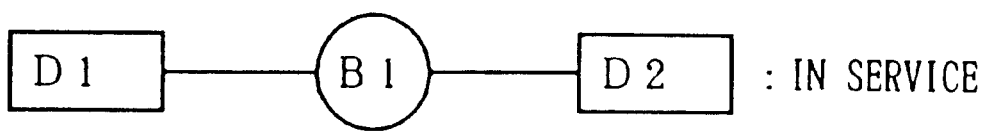 : IN SERVICE
 : ON HOLD
D1~D3 : DEVICE
B1 : CALL BRIDGE

F I G. 8

| PARTIAL CALL STATE | SUMMARY |
|---|---|
| Null State | Device is free |
| Connected State | Destination responded when device originates call. Response returned to destination when device is called. |
| Initiated State | Call request from device received. |
| Alerting | Destination called when device originates call. |
| Originated State | Call origination with respect to device requested. |
| Failed State | Normal state transition of device failed for some reason. |

FIG. 10

| CALL BRIDGE STATE | SUMMARY |
|---|---|
| Bridge Null State | No path connected between 2 partial calls. |
| Bridge State | Path connected between 2 partial calls. |

FIG. 13

| | REQUEST & REQUEST SUCCESS NOTIFICATION | TRANSITION OF CALL MODEL BEFORE SERVICE REQUEST → AFTER COMPLECTION OF SERVICE |
|---|---|---|
| (A) | ORIGINATE CALL FROM SWITCH ENGINE TO DEVICE<br>REQUEST:<br>eccMakeTrunkCallReq<br>REQUEST SUCCESS NOTIFICATION:<br>ECCMakeTrunkCallRsp | P.C. Null → P.C. Originated |
| (B) | RELEASE CONNECTION BETWEEN SWITCH ENGINE & DEVICE<br>REQUEST:<br>eccClearTrunkConnectionReq<br>REQUEST SUCCESS NOTIFICATION:<br>ECCClearTrunkConnectionRsp | P.C. * → P.C. Null<br>*: STATE OTHER THAN NULL STATE |
| (C) | CONNECTION OF PATH BETWEEN 2 DEVICES<br>REQUEST:<br>eccCreateCallBridgeReq<br>REQUEST SUCCESS NOTIFICATION:<br>ECCCreateCallBridgeRsp | CB Bridge Null, P.C.1 *, P.C.2 * → CB Bridge — P.C.1 *, P.C.2 *<br>*: STATE OTHER THAN NULL & FAILED STATES |
| (D) | RELEASE PATH CONNECTION<br>REQUEST:<br>eccClearCallBridgeReq<br>REQUEST SUCCESS NOTIFICATION:<br>ECCClearCallBridgeRsp | CB Bridge — P.C.1 *, P.C.2 * → CB Bridge Null, P.C.1 *, P.C.2 *<br>*: ARBITRARY STATE |

P.C: PARTIAL CALL
CB: CALL BRIDGE

FIG. 14

| | CALL INFORMATION NOTIFICATION | TRANSITION OF CALL MODEL BEFORE SERVICE REQUEST → AFTER COMPLETION OF SERVICE |
|---|---|---|
| (A) | CALL FROM DEVICE RECEIVED BY SWITCH ENGINE<br>NOTIFICATION NAME:<br>　　ECCIncomingCallEvent | P.C. (Null) ⟶ P.C. (Initiated) |
| (B) | CALL ORIGINATED FROM SWITCH ENGINE TO DEVICE<br>NOTIFICATION NAME:<br>　　ECCOutgoingCallEvent | P.C. (Null) ⟶ P.C. (Originated) |
| (C) | DEVICE CALLED<br>NOTIFICATION NAME:<br>　　ECCDeliveredEvent | P.C. (Originated) ⟶ P.C. (Alerting) |
| (D) | DEVICE RESPONDS<br>NOTIFICATION NAME:<br>　　ECCEstablishedEvent | P.C. (*) ⟶ P.C. (Connected)<br>*: ORIGINATED OR ALERTING STATE |
| (E) | CONNECTION BETWEEN SWITCH ENGINE & DEVICE FAILED<br>NOTIFICATION NAME:<br>　　ECCFailedEvent | P.C. (*) ⟶ P.C. (Failed)<br>*: ORIGINATED, ALERTING OR CONNECTED STATE |
| (F) | CONNECTION BETWEEN SWITCH ENGINE & DEVICE RELEASED<br>ECCTrunkConnectionClearedEvent | P.C. (*) ⟶ P.C. (Null)<br>*: STATE OTHER THAN NULL STATE |
| (G) | PATH BETWEEN 2 DEVICES CONNECTED<br>NOTIFICATION NAME:<br>　　ECCCallBridgeConnectedEvent<br><br>FURTHER, PARTIAL CALL IN INITIATED STATE MAKES TRANSITION TO CONNECTED STATE RESPONSIVE TO THIS NOTIFICATION | CB: Bridge(Null), P.C.1, P.C.2 ⟶ CB: Bridge connected to P.C.1 and P.C.2<br><br>P.C.1 or P.C.2<br>(Initiated) ⟶ (Connected) |
| (H) | CONNECTION OF PATH RELEASED<br>NOTIFICATION NAME:<br>　　ECCCallBridgeDisconnectedEvent | CB: Bridge connected to P.C.1 and P.C.2 ⟶ CB: Bridge(Null), P.C.1, P.C.2 |

P.C.: PARTIAL CALL, CB: CALL BRIDGE

FIG. 17

[S 1] TALKIE DEVICE DRIVING SERVICE

[MODEL] CONVENTIONAL REQUIRES DUMMY DEVICE FOR THIS SERVICE

| ECC API | CONVENTIONAL API |
|---|---|
| (1-1) ONLY CONNECTION OF DEVICE & SWITCH ENGINE EXISTS | (C1-1) CONNECTION OF DEVICE & DUMMY DEVICE EXISTS BY CALL |

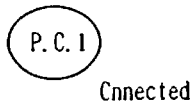 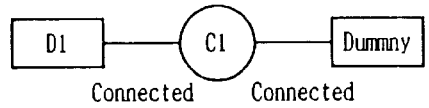

[S 2] JOINT SERVICE

[MODEL] CONVENTIONAL API REALIZES THIS SERVICE IN THE FORM OF TRANSFER

| ECC API | CONVENTIONAL API |
|---|---|
| (2-1) SWITCH ENGINE CALLED FROM DEVICE #1 | (C2-1) SWITCH ENGINE CALLED FROM DEVICE #1 & CALL GENERATED BETWEEN DUMMY DEVICE |

 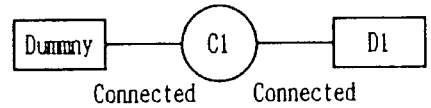

(2-2) SWITCH ENGINE CALLED FROM DEVICE #2    (C2-2) SWITCH ENGINE CALLED FROM DEVICE #2

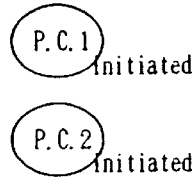 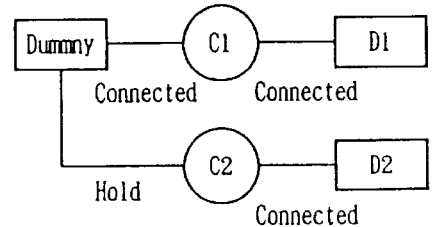

(2-3) CONNECT PATH BETWEEN 2 DEVICES (C2-3) TRANSFER FROM DUMMY DEVICE TO DEVICE #2

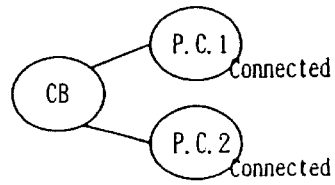 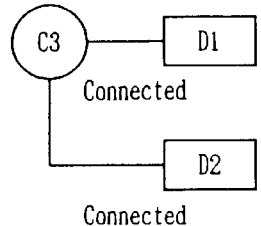

FIG. 18

[S 3] CALLED-CALL ORIGINATING SERVICE

[MODEL] ECC API: APPLICATION REQUESTS 23    CONVENTIONAL API: APPLICATION MAKES NO REQUEST

ECC API                                     CONVENTIONAL API (3-1) SWITCH ENGINE CALLED FROM DEVICE #1   (C3-1) SWITCH ENGINE CALLED FROM DEVICE #1

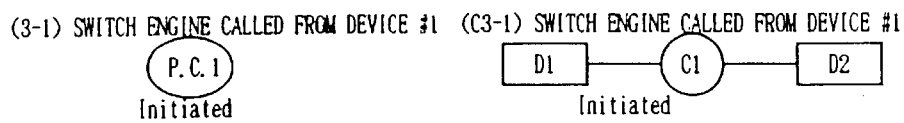

(3-2) CALL ORIGINATED FROM SWITCH ENGINE TO DEVICE #2    (C3-2) CALL ORIGINATED FROM SWITCH ENGINE TO DEVICE #2

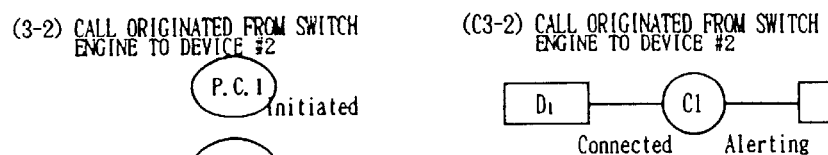

(3-3) CONNECT PATH BETWEEN 2 DEVICES        (C3-3) CALL ESTABLISHED BETWEEN 2 DEVICES

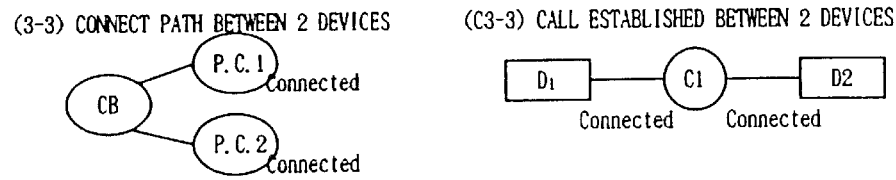

[S 4] TALKIE (GUIDANCE) CONNECTION SERVICE

[MODEL] CONVENTIONAL API REALIZES THIS SERVICE IN THE FORM OF TRANSFER

ECC API                                     CONVENTIONAL API (4-1) CALL ORIGINATED FROM SWITCH ENGINE TO DEVICE #1    (C4-1) SWITCH ENGINE GENERATES CALL BETWEEN DEVICE #1 & DUMMY DEVICE

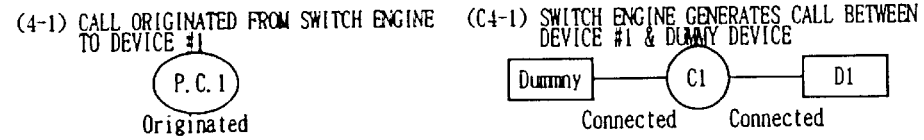

(4-2) SWITCH ENGINE CALLED FROM DEVICE #2   (C4-2) SWITCH ENGINE CALLED FROM DEVICE #2

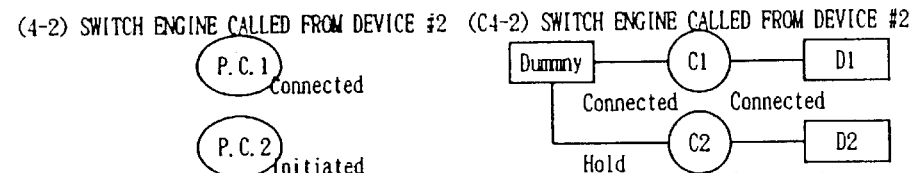

(4-3) CONNECT PATH BETWEEN 2 DEVICES        (C4-3) TRANSFER FROM DUMMY DEVICE TO DEVICE #2

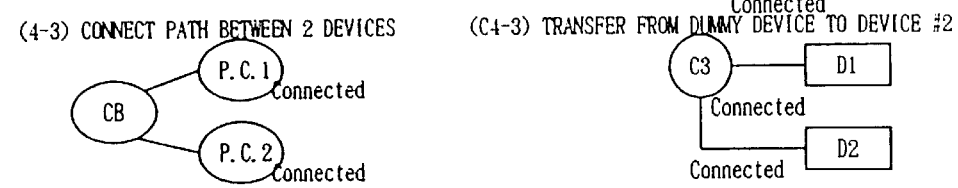

FIG. 19

[S 5] CONNECTION-CALL ORIGINATING SERVICE BY SWITCH ENGINE

[MODEL] ECC API: 5-1~5-3 MADE BY
                CTI APPLICATION
      E C C  A P I

CONVENTIONAL TSAPI: C5-1~C5-3 MADE
                      BY 1 REQUEST
        CONVENTIONAL API (5-1) CALL ORIGINATED FROM SWITCH ENGINE TO DEVICE #1

(C5-1) CALL ORIGINATED FROM SWITCH ENGINE TO DEVICE #1

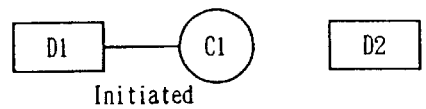

(5-2) CALL ORIGINATED FROM SWITCH ENGINE TO DEVICE #2

(C5-2) CALL ORIGINATED FROM SWITCH ENGINE TO DEVICE #2

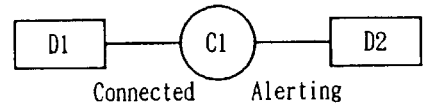

(5-3) CONNECT PATH BWTWEEN 2 DEVICES (C5-3) CALL ESTABLISHED BETWEEN 2 DEVICES

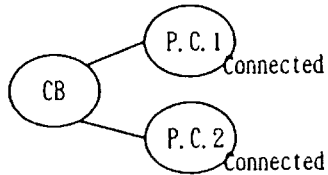
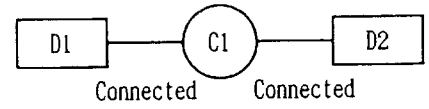

FIG. 20

[S 6] BROADCAST SERVICE

[MODEL] CALL MODEL IS CONFERENCE IN CONVENTIONAL API

ECC API                                                  CONVENTIONAL API (6-1) PRE-ESTABLISH CONNECTION BETWEEN          (C6-1) ORIGINATE CALL FROM SWITCH
      DEVICE & SWITCH ENGINE                             ENGINE TO DEVICE #1

Originated

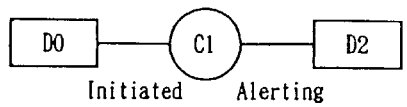
Initiated        Alerting (6-2) ORIGINATE CALL FROM SWITCH ENGINE         (C6-2) REQUEST CONFERENCE TO PLURAL DEVICES
      TO PLURAL DEVICES                                  FROM SWITCH ENGINE

Originated

Originated

Originated

Originated

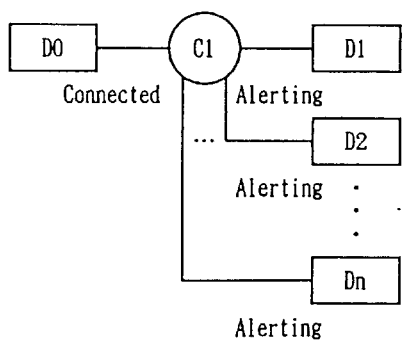
Connected     Alerting (6-3) CONNECT PATH BETWEEN 2 DEVICES            (C6-3) ESTABLISH CONFERENCE AMONG D0
                                                         & OTHER DEVICES

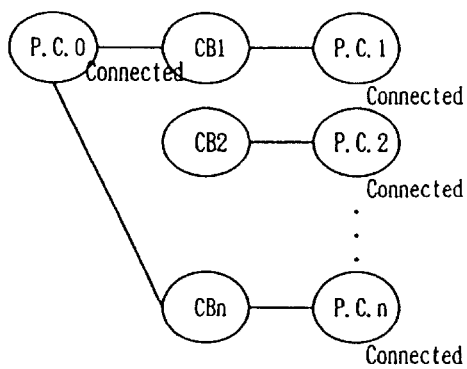

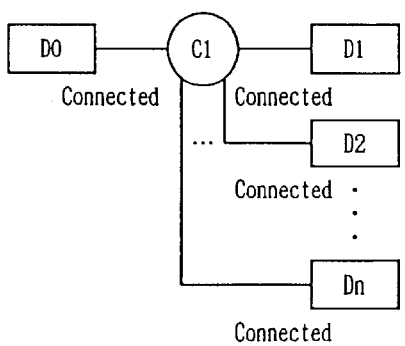

FIG. 21

[S 7] CALL WAITING SERVICE

[MODEL] PROCEDURE IS COMPLEX IN CONVENTIONAL API

ECC API CONVENTIONAL API (7-1) CONNECTIONS ESTABLISHED AMONG DEVICES & SWITCH ENGINE & PATH OF 2 CONNECTIONS CONNECTED (C7-1) DEVICE #1 - DEVICE #2: CONNECTED
DEVICE #3: QUEUED STATE

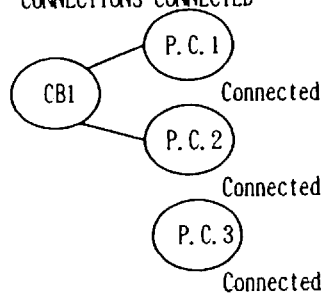
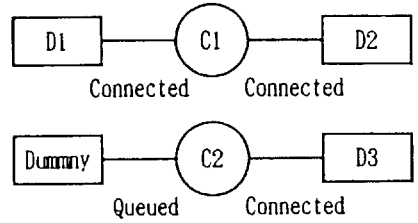

(7-2) RELEASE CONNECTION OF PATH (C7-2) DEVICE #1 - DEVICE #2: CONNECTED
DEVICE #3: TRANSFER CALL FROM DUMMY DEVICE TO D1

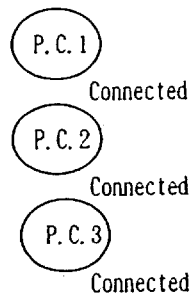
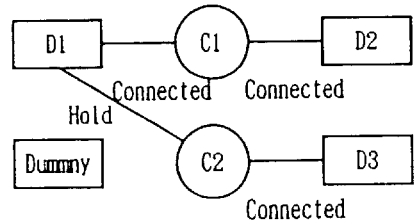

(7-3) CONNECT PATH OTHER THAN THOSE OF (7-1) ABOVE (C7-3) DEVICE #2: TRANSFER CALL FROM D1 TO DUMMY DEVICE
DEVICE #3: HOLD STATE → CONNECTED STATE

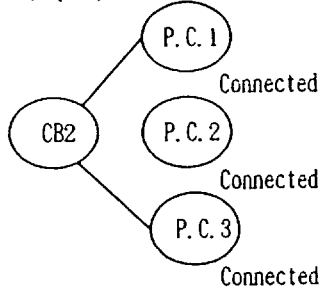
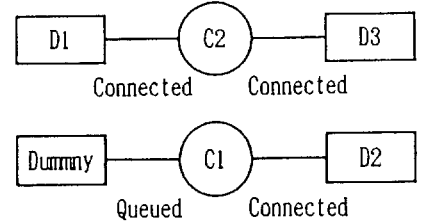

FIG. 22

[S 8] CONFERENCE SERVICE

[MODEL] ECC API: AWARE OF CONFERENCING DEVICES
CONVENTIONAL API: NOT AWARE OF CONFERENCING DEVICES SINCE ABSORBED BY CALL

ECC API (8-1) 4TH DEVICE PARTICIPATES DURING CONFERENCE OF 3 CONFERENCING DEVICES (P.C.0 IS P.C. OF CONFERENCING DEVICE)

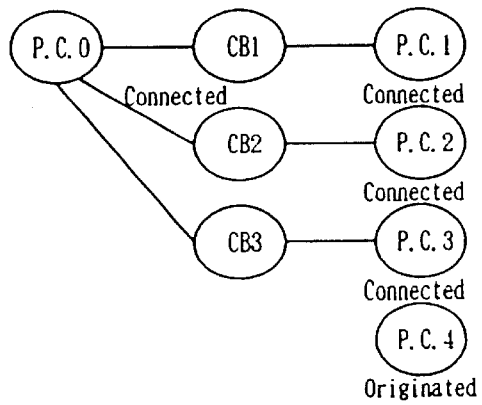

CONVENTIONAL API (C8-1) 4TH DEVICE PARTICIPATES DURING CONFERENCE OF 3 CONFERENCING DEVICES (P.C.0 IS P.C. OF CONFERENCING DEVICE)

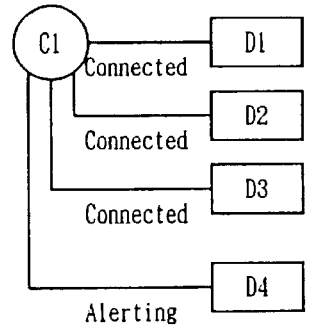

(8-2) CONNECT PATHS OF CONFERENCING DEVICES & 4TH DEVICE

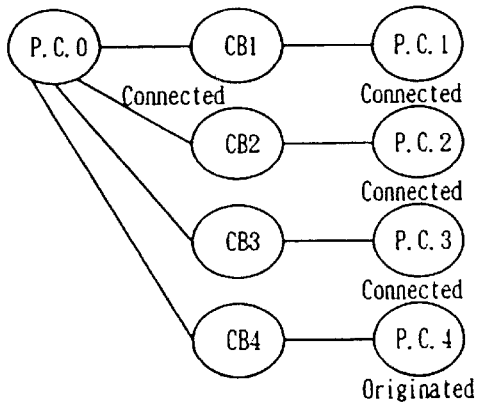

(C8-2) 4TH DEVICE ASSUMES CONNECTED STATE WITH CONFERENCE

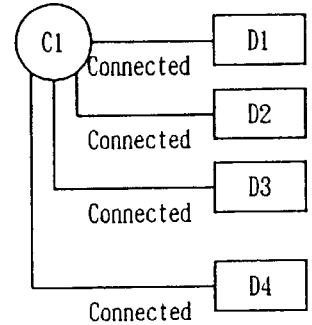

COMPUTER-TELEPHONE INTEGRATED SYSTEM, SWITCHING CONTROL APPARATUS AND STORAGE MEDIUM

BACKGROUND OF THE INVENTION

1. Field of the Invention

The present invention generally relates to computer-telephone integrated systems, and more particularly to a computer-telephone integrated system in which a telephone switching service request part makes a switching control request with respect to a switch engine which has a function of switching via a service request process/call information notifying means, and the switching engine makes a call process. The present invention also relates to a switching control apparatus adapted to the computer-telephone integrated system, and to a computer-readable storage medium which stores a program for causing a computer to realize the functions of the switching control apparatus.

2. Description of the Related Art

Conventionally, computers such as personal computers employ a call connection control system which makes a switching control request with respect to a switch engine having a switching function, by use of an Application Programmatic Interface (API), and makes a call process of a telephone switching by the switch engine. A Telephony Services Application Programmatic Interface (TSAPI) is a typical example of the API.

The TSAPI uses a call model of the telephone switching shown in FIG. 1. When making a connection by the telephone switching, a device 33 and a switching system (not shown) are connected by a connection 31, and the switching system and a device 34 are connected by a connection 32. A call 30 is completed by connecting the two connections 31 and 32 by the switching system, so as to enable a service. FIG. 1 shows the call model in this state where the service is possible.

According to this call model shown in FIG. 1, one call 30 requires the two connections 31 and 32. In other words, the call is based on two connections, and two connections are necessary in order to complete one call. When representing a state where only one device participates, such as when making a call out, a dummy device and a dummy connection are required. Hence, when a call control is carried out in this call model, call information is managed by the connections 31 and 32 which are identified by a combination of a device identifier and a call identifier and describe the relationships of the devices 33 and 34 and the call 30. The TSAPI uses the above described call model to carry out the call control and the call management.

FIG. 2 is a diagram for explaining connection states of the TSAPI. The connection states of the TSAPI include a null state, a connected state, an initiated state, an alerting state, a fail state, a hold state and a queued state.

The null state refers to a state where the call and the device are not connected, physically or logically.

The connected state refers to a state where the call and the device are connected both physically and logically. In a case where the device makes originates a call, the connected state refers to a state where a transmission procedure with respect to a destination is completed. On the other hand, in a case where the device makes a call reception, the connected state refers to a state where a response is returned with respect to the calling.

The initiated state refers to a state where the switching system urges a user to carry out the procedure necessary for the call origination.

The alerting state refers to a state where the call is calling the device, and includes three modes, namely, a ringing mode, an offered mode and an entering distribution mode. The ringing mode refers to a mode in which a normal device is being called. This normal device excludes offered devices such as a device which transfers the call, and distribution devices such as a key number telephone which distributes the call. The offered mode refers to a mode in which the call is received by an offered device and an instruction such as where the call is to be transferred is waited with respect to the received call. The entering distribution mode refers to a mode in which the call is received by a distribution device.

The fail state refers to a state where a normal state transition of the connection failed for some reason.

The hold state refers to a state where the call and the device are logically connected, but are not physically connected.

The queued state refers to a state where the occurrence of some kind of a state change or an action is waited.

FIG. 3 is a diagram showing state transitions among the connection states of the TSAPI shown in FIG. 2.

Next, a description will be given of the hold state of the call model shown in FIG. 1, by referring to FIG. 4. In FIG. 4, it is assumed for the sake of convenience that a service is being provided between a device D1 and a device D2, and a device is on hold. In this case, the devices D1 and D2 are in the connected state, and the call and the devices D1 and D2 are both physically and logically connected.

On the other hand, since the device D3 is on hold, the call has acquired a line, but a communication circuit of the device D3 is disconnected from the line. Hence, the call exists with respect to the device D3, and the call and the device D3 are logically connected. However, because the communication circuit of the device D3 is disconnected from the line, the device D3 is physically disconnected from the device D1, and no service can be provided between the devices D1 and D3. In this case, although the device D3 on hold is physically disconnected from the device D1, the device D3 by itself cannot exist in the call model because the call exists with respect to the device D3.

According to the conventional call information management, the call and the device are connected, and it is impossible to manage only the device by disconnecting the device, as may be seen from the hold state described above. In addition, since the call is based on two connections, and two connections are necessary in order to complete one call as described above, it is impossible for only one device to exist in the call model. As a result, there is a problem in that it is impossible to request from the application a control in units of devices, such as controlling the call reception or the call origination of a trunk.

SUMMARY OF THE INVENTION

Accordingly, it is a general object of the present invention to provide a novel and useful computer-telephone integrated system, switching control apparatus and computer-readable storage medium, in which the problem described above is eliminated.

Another and more specific object of the present invention is to provide a computer-telephone integrated system, a switching control apparatus and a computer-readable storage medium which enable control in units of devices, by making a path connection state independent when a Computer Telephony Integration (CTI) application, which is a telephone switching service request part, when controlling a call of a switch engine.

Still another object of the present invention is to provide a computer-telephone integrated system comprising a switch engine carrying out a switching control, devices coupled to the switch engine, a service request part requesting a telephone switching service with respect to the switch engine, and service request process/call information notifying means providing an interface function between the switch engine and the service request part, where the service request process/call information notifying means processes a switching service request from the service request part to the switch engine, and notifies call information related to the devices and the switch engine from the switching engine to the service request part, and the call information includes information related to states of the devices and information related to a connection of a path between the switch engine and the devices. According to the computer-telephone integrated system of the present invention, the call information management by the service request process/call information notifying means is made using the two kinds of information. Hence, it is possible to carry out a control in units of devices, independently of the connected state of the path, when controlling the call in response to a request from the service request part.

A further object of the present invention is to provide the computer-telephone integrated system described above, wherein a connection between a first one of the devices and the switch engine is established independently of a connection of a path between a second one of the devices and the switch engine, and a service is provided in units of the first device having an established connection with the switch engine, based on a service request from the service request part. According to the computer-telephone integrated system of the present invention, the connection between one device and the switch engine can be established independently of the connection of the path between the switch engine and another device. As a result, it is possible to provide a service in units of the one device having the established connection to the switch engine, thereby enabling a one-directional connection such as driving a talkie apparatus.

Another object of the present invention is to provide the computer-telephone integrated system described above, wherein a path between two devices is connected based on a service request from the service request part when the switch engine is called from the two devices. According to the computer-telephone integrated system of the present invention, it is possible to provide a service between two devices by connecting the path between the two devices when the switch engine is called from the two devices.

Still another object of the present invention is to provide the computer-telephone integrated system described above, wherein the switch engine originates a call to a first one of the devices based on a service request from the service request part when the switch engine is called from a second one of the device, so as to connect a path between the first device and the second device. According to the computer-telephone integrated system of the present invention, it is possible to connect two devices via the switch engine when one of the two devices calls the other of the two devices. In other words, when one device dials the other device, the switch engine is called. Then, the switch engine originates a call to the other device and calls the other device. The two devices are connected by the switch engine when a response is received from the other device.

A further object of the present invention is to provide the computer-telephone integrated system described above, wherein when the switch engine is called from a first one of the devices after originating a call from the switch engine to a second one of the devices and establishing a connection between the switch engine and the second device, the switch engine connects a path between the first device and the second device based on a service request from the service request part. According to the computer-telephone integrated system of the present invention, it is possible to provide a guidance service by making the second device a guidance apparatus, and making the first device a guidance listener.

Another object of the present invention is to provide the computer-telephone integrated system described above, wherein the switch engine independently originates a call to two of the devices based on a service request from the service request part, and connects a path between the two devices. According to the computer-telephone integrated system of the present invention, it is possible to make an accounting to a company with respect to a call which is made between a customer's telephone and a company employee's home telephone, for example.

Still another object of the present invention is to provide the computer-telephone integrated system described above, wherein after establishing a connection between a first one of the devices and the switch engine, the switch engine simultaneously originates a call to the devices based on a service request from the service request part and connects a path between the first device and one of the devices which responds, so as to provide a broadcast service. According to the computer-telephone integrated system of the present invention, it is possible to provide a broadcast service.

A further object of the present invention is to provide the computer-telephone integrated system described above, wherein, in a state where a connection between the switch engine and three or more of the devices is established and a path is connected between first and second devices among the three or more devices, the switch engine releases the path between the first and second devices based on a service request from the service request part, and switches a connection of a path by connecting a path between one of the first and second devices and a third device having an established connection to the switch engine. According to the computer-telephone integrated system of the present invention, it is possible to freely switch the device to which the call is established.

Another object of the present invention is to provide the computer-telephone integrated system described above, wherein the switch engine carries out a conference based on a service request from the service request part by originating a call to and connecting to a first one of the devices which is to make the conference, connecting a second one of the devices which is to participate in the conference to the switch engine by originating a call from the switch engine to the second device or by being called from the second device, and connecting a path between the first device and the second device. According to the computer-telephone integrated system of the present invention, it is possible to provide a conferencing service.

Still another object of the present invention is to provide a computer-readable storage medium which stores a program for causing a computer to carry out a switching control, comprising first means for causing the computer to process a service request from a service request part requesting a telephone switching service with respect to a switch engine which carries out a switching control, and second means for causing the computer to notifying, to the service request part, information related to states of devices coupled to the switch engine and information related to a connection of a path between the switch engine and the devices. According to the storage medium of the present invention, it is possible to realize switching functions by a computer which executes the program stored in the storage medium.

A further object of the present invention is to provide the computer-readable storage medium described above, wherein the first means includes means for causing the computer to originate a call to the devices, means for causing the computer to release a connection between the switch engine and the devices, means for causing the computer to connect a path between two of the devices, and means for causing the computer to release a connection of a path between two of the devices. According to the storage medium of the present invention, it is possible to process various kinds of request from the service request part by the computer which executes the program stored in the storage medium.

Another object of the present invention is to provide a switching control apparatus comprising a switch engine carrying out a switching control, a service request part requesting a telephone switching service with respect to the switch engine, and service request process/call information notifying means providing an interface function between the switch engine and the service request part, wherein the service request process/call information notifying means processes a switching service request from the service request part to the switch engine, and notifies call information related to devices and the switch engine from the switching engine to the service request part, and the call information includes information related to states of the devices and information related to a connection of a path between the switch engine and the devices. According to the switching control apparatus of the present invention, the call information management by the service request process/call information notifying means is made using the two kinds of information. Hence, it is possible to carry out a control in units of devices, independently of the connected state of the path, when controlling the call in response to a request from the service request part.

Other objects and further features of the present invention will be apparent from the following detailed description when read in conjunction with the accompanying drawings.

BRIEF DESCRIPTION OF THE DRAWINGS

FIG. 2 is a diagram for explaining connection states of the TSAPI;

FIG. 7 is a diagram for explaining a hold state of the call model shown in FIG. 6;

FIG. 8 is a diagram for explaining partial call states of a control call API;

FIG. 10 is a diagram for explaining call bridge states of the call control API;

FIG. 13 is a diagram for explaining a relationship of API requests and transitions of the call model;

FIG. 14 is a diagram for explaining a relationship of a call information notification of an API program and the transition of the call model;

FIG. 17 is a diagram for explaining a service which can be provided in the present invention, by making a comparison with the conventional system;

FIG. 18 is a diagram for explaining a service which can be provided in the present invention, by making a comparison with the conventional system;

FIG. 19 is a diagram for explaining a service which can be provided in the present invention, by making a comparison with the conventional system;

FIG. 20 is a diagram for explaining a service which can be provided in the present invention, by making a comparison with the conventional system;

FIG. 21 is a diagram for explaining a service which can be provided in the present invention, by making a comparison with the conventional system;

FIG. 22 is a diagram for explaining a service which can be provided in the present invention, by making a comparison with the conventional system;

DESCRIPTION OF THE PREFERRED EMBODIMENTS

First, a description will be given of the operating principle of a computer-telephone integrated system according to the present invention.

Figure 5:
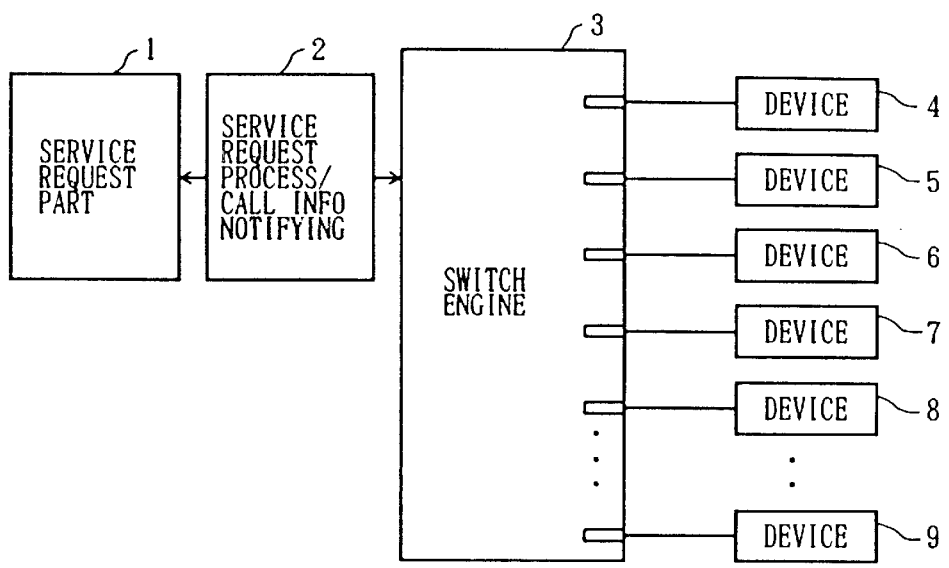
FIG. 5 is a system block diagram showing the basic construction of a computer-telephone integrated system according to the present invention.

FIG. 5 is a system block diagram showing the basic construction of the computer-telephone integrated system.

The computer-telephone integrated system includes a service request part 1, a service request process/call information notifying means 2, a switch engine 3, and devices 4 through 9.

The switch engine 3 is provided to carry out a switching control, and is made of a switching system, a microprocessor which is mounted on a board of a computer having a switching function, or the like. The service request part 1 is made up of an application which is installed in the computer for the purposes of forming a computer-telephone integrated system. This application which is installed in the computer will hereinafter be referred to as a Computer Telephony Integration (CTI) application. The service request part 1 requests a telephone switching service with respect to the switch engine 3. The devices 4 through 9 are respectively made of an extension telephone terminal, trunk or the like.

The service request process/call information notifying means 2 notifies the service request from the service request part (CTI application) 1 to the switch engine 3. In addition, the service request process/call information notifying means 2 notifies call information between the switch engine 3 and the devices 4 through 9. The service request process/call information notifying means 2 forms a call control Application Programmatic Interface (API) between the service request part 1 and the switch engine 3, for notifying the switching service request and the call information. The call information is managed by this service request process/call information notifying means 2, and the switch engine notifies the call information to the service request part 1 based on the call information management carried out by the service request process/call information notifying means 2.

Figure 1:
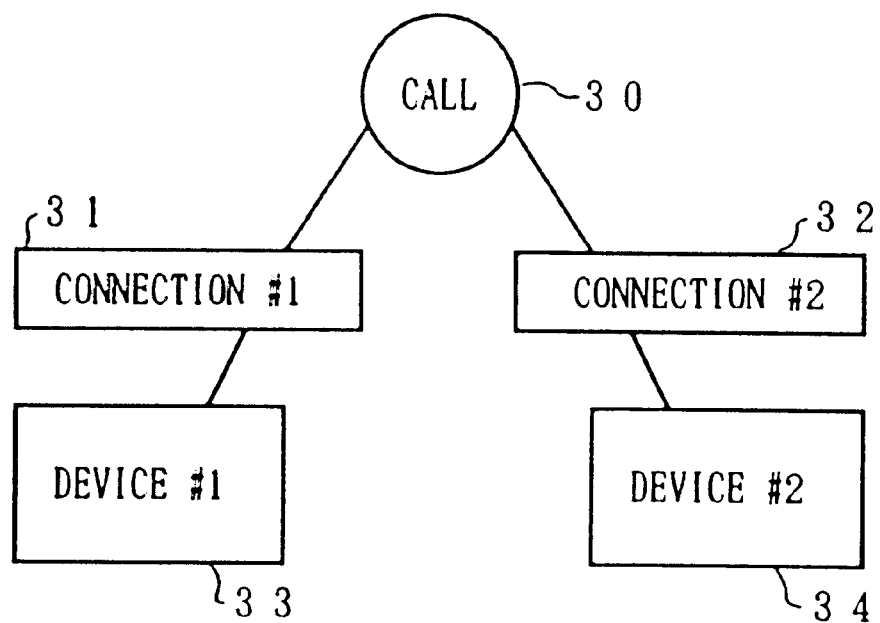
FIG. 1 is a diagram for explaining a TSAPI call model.
Figure 3:
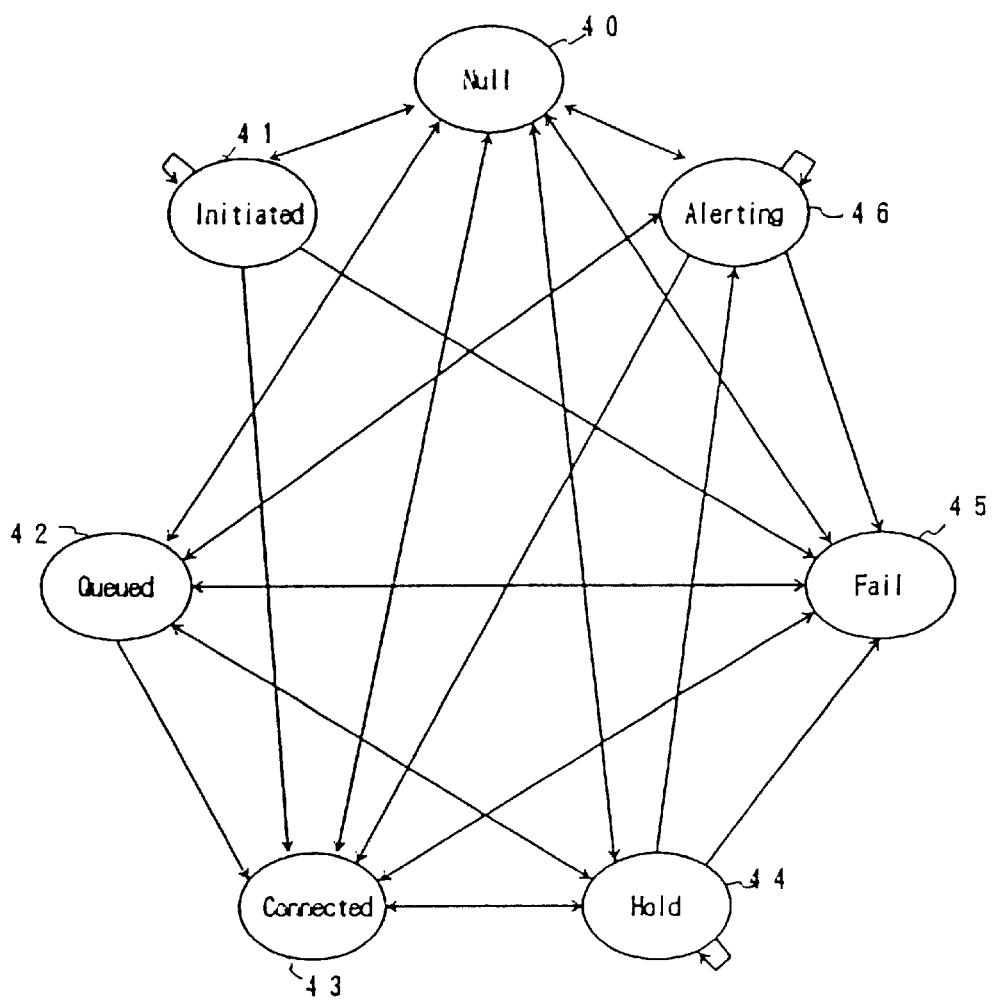
FIG. 3 is a state transition diagram of TSAPI connections.

According to the computer-telephone integrated system having the construction shown in FIG. 1, the service request part 1 can receive an arbitrary switching service by controlling the switch engine 3. For example, it is possible to make a broadcast communication from the device 4 to the devices 5 through 9.

In order to realize a control in units of devices with respect to the service request from the service request part 1, the service request process/call information notifying means 3 manages the call information by dividing the call information into device state information and path connection information.

Call Model of the Present Invention

In the present invention, the call control API uses, as a management resource for the CTI application to control the state of the call, the call information made up of two kinds of information, namely, a partial call PC which manages a communication state of a single device and a call bridge CB which manages a path connection between two partial calls PC.

Figure 6:
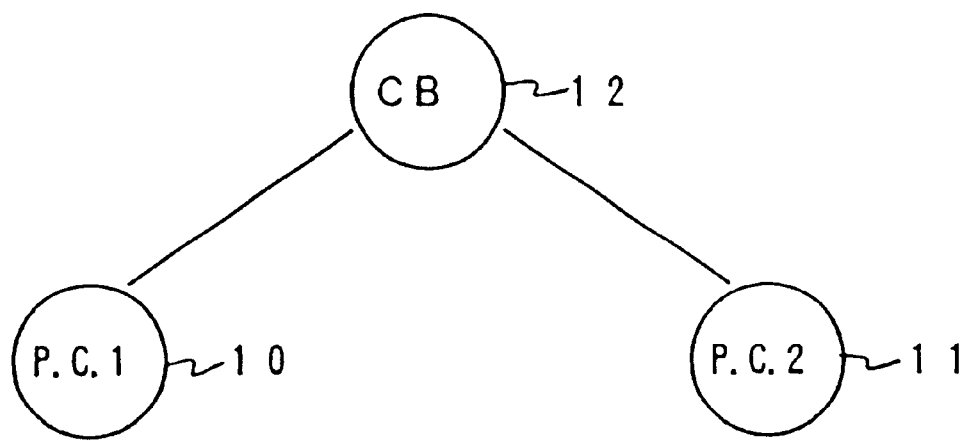
FIG. 6 is a diagram for explaining a call model of the present invention when two devices are in service.

FIG. 6 is a diagram for explaining a call model of the present invention when two devices are in service, similarly to FIG. 1 described above. In FIG. 6, a partial call 10 and a partial call 11 are connected via a call bridge 12.

The partial call PC has a partial call identification (ID) as a logical identifier, and a device ID as a physical identifier.

The partial call PC is generated when a call originates from a device or when a call is received by a device. The partial call PC becomes null when a connection of a device is disconnected. When the CTI application carries out a control with respect to a device, the control is carried out by requesting a service with respect to the partial call PC. The partial call PC can exist by itself, regardless of the call bridge CB, and can request a service with respect to each device such as a telephone terminal, independently of a state of a path. As a result, it is possible to realize the control in units of devices with respect to the service request from the CTI application.

On the other hand, the call bridge CB is generated when a path between two devices such as telephone terminals is connected, and becomes null when the path is released. The call bridge CB does not affect the partial call PC. Accordingly, it is possible to carry out the control in units of the devices such as the telephone terminals by the request of the CTI application.

Figure 4:
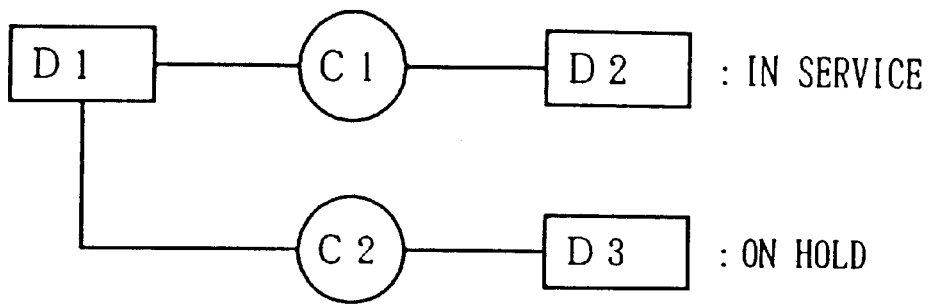
FIG. 4 is a diagram for explaining a hold state.

FIG. 7 is a diagram for explaining a hold state of the call model shown in FIG. 6. In FIG. 7, those parts which are the same as those corresponding parts in FIG. 4 are designated by the same reference numerals, and a description thereof will be omitted. As may be seen from FIG. 7, the device D3 is isolated, and more closely reflects the actual state as compared to FIG. 4 described above.

Partial Call of the Present Invention

FIG. 8 is a diagram for explaining partial call states of the call control API. As shown in FIG. 8, the partial call states include a null state, a connected state, an initiated state, an alerting state, and originated state, and a failed state.

The null state refers to a state where a device such as a telephone terminal is free. The connected state refers to a state where a destination such as a telephone terminal responded in a case where a device such as a telephone terminal originated a call, and a state where a response is returned to the destination such as the telephone terminal in a case where the device such as the telephone terminal received a call. The initiated state refers to a state where a call request from a device such as a telephone terminal is received by a switching system.

The alerting state refers to a state where a switching system is calling a destination such as a telephone terminal when a device such as a telephone terminal is originating a call. The originated state refers to a state where a switching system requests a call origination with respect to a device such as a telephone terminal. The failed state refers to a state where a normal state transition of a device such as a telephone terminal failed for some reason.

Figure 9:
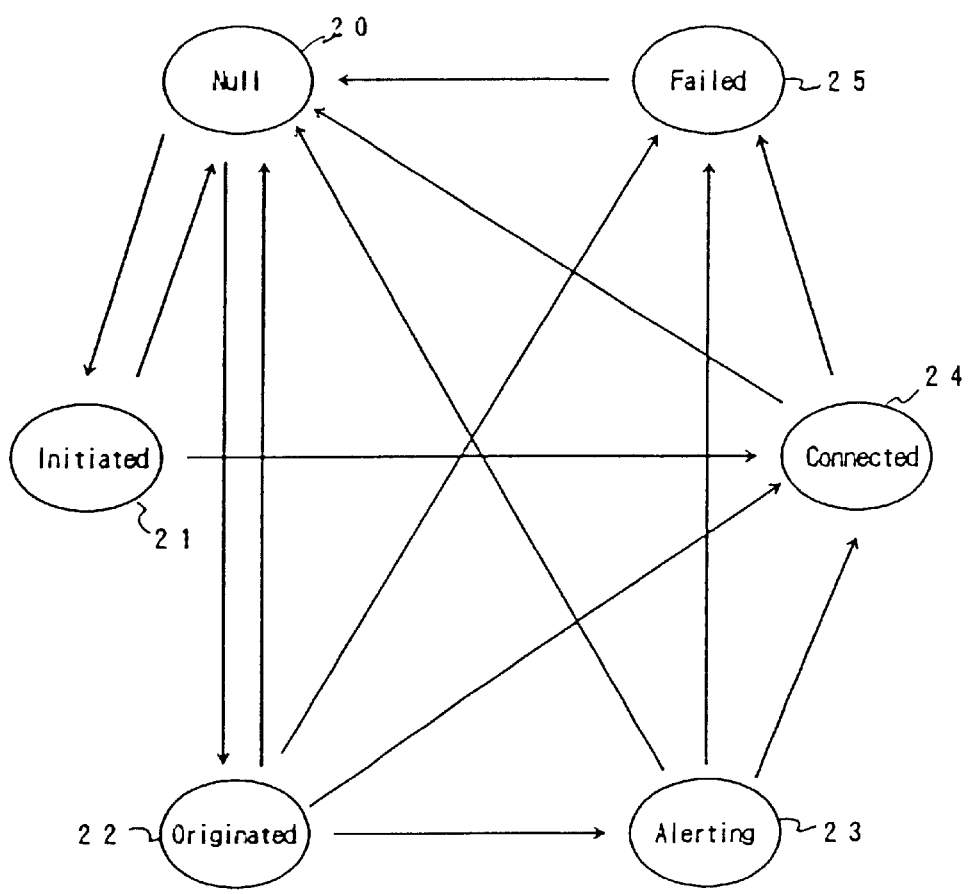
FIG. 9 is a state transition diagram of the partial call states of the call control API shown in FIG. 8.

FIG. 9 is a state transition diagram of the partial call states of the call control API shown in FIG. 8.

Call Bridge of the Present Invention

The call bridge will be described with reference to FIG. 10 which shows call bridge states of the call control API. As shown in FIG. 10, the call bridge states include a bridge null state and a bridge state. The bridge null state refers to a state where no path is connected between two partial calls. On the other hand, the bridge state refers to a state where a path is connected between two partial calls.

Figure 11:
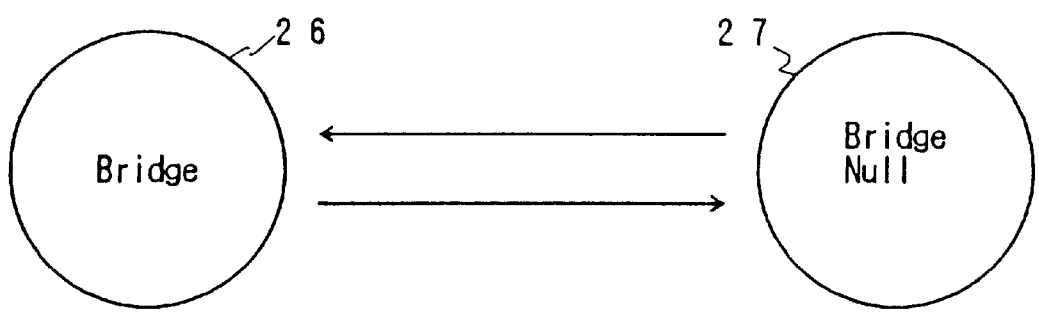
FIG. 11 is a state transition diagram of the call bridge states of the call control API shown in FIG. 10.

FIG. 11 is a state transition diagram of the call bridge states of the call control API shown in FIG. 10.

Call Control API of the Present Invention

The call control API of the present invention is based on the call model shown in FIG. 6, and has the following four functions, as call control functions of the CTI application of the computer. The four functions include (i) a function of originating a call to a device such as a telephone terminal, (ii) a function of releasing a connection between a switch engine and a device such as a telephone terminal, (iii) a function of connecting a path between two devices such as telephone terminals, and (iv) a function of releasing a path connected between two devices such as telephone terminals.

In addition, among the four functions of the call control API of the present invention, the function (i) generates the partial call, and the function (ii) nullifies the partial call. In addition the function (iii) generates the call bridge, and the function (iv) nullifies the call bridge. Accordingly, all forms of control possible in the call model show in FIG. 6 can be realized solely by the above described functions (i) through (iv), thereby making it possible to provide various kinds of switching services.

First Embodiment of the Present Invention

Figure 12:
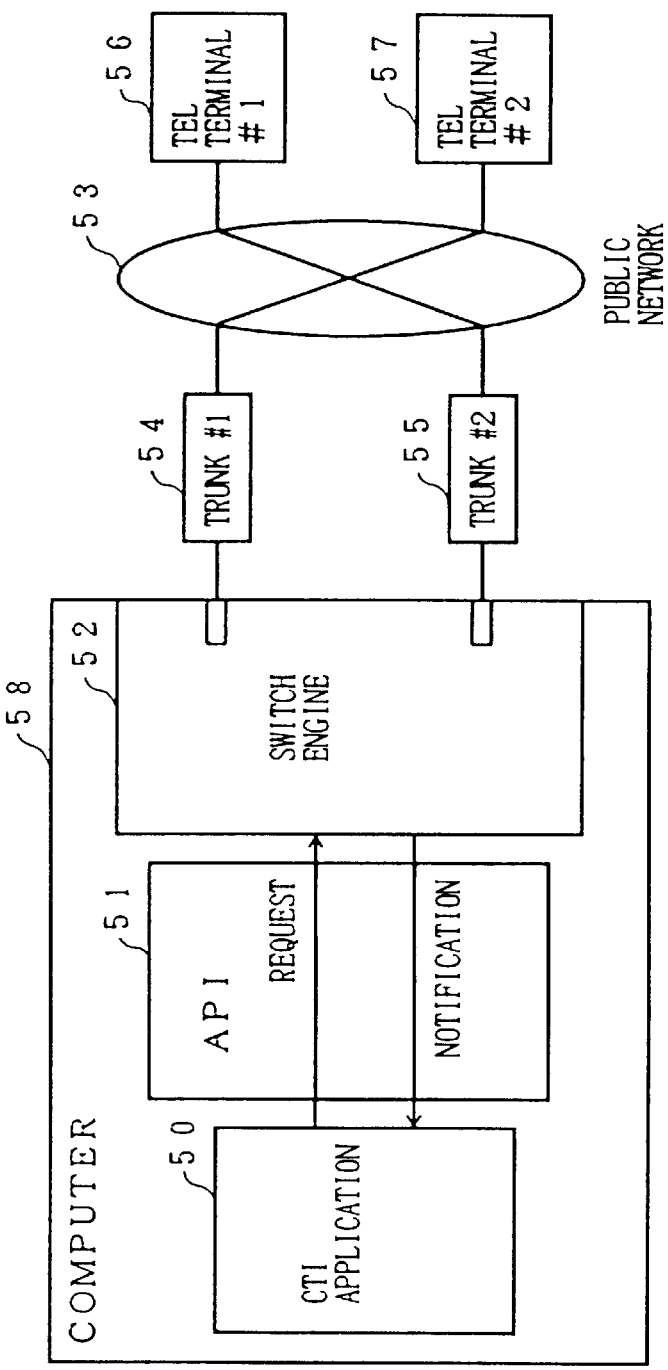
FIG. 12 is a diagram showing the construction of a first embodiment of a computer-telephone integrated system according to the present invention.

FIG. 12 is a diagram showing the construction of a first embodiment of a computer-telephone integrated system according to the present invention. In FIG. 12, a switch engine 52 and a CTI application 50 are provided within the computer 58, and a call control API 51 is used for the communication between the switch engine 52 and the CTI application 50. The CTI application 50 corresponds to the service request part 1 shown in FIG. 5, and the call control API 51 corresponds to the service request process/call information notifying means 3 shown in FIG. 5.

In this embodiment, the switch engine 52 includes a board which is mounted on the computer 58 and has the functions of a switching system, and a switching program for controlling this board. The call control API 51 carries out processes such as processing a switching service request received from the CTI application 50, and notifying call information to the CTI application 50. In addition, a telephone terminal (#1) 56 and a telephone terminal (#2) 57 are respectively coupled to trunks 54 and 55 of the switch engine 52 via a public network 53 or the like.

The call control API 51 can realize the functions (i) through (iv) described above by service request from the CTI application 50 to the switch engine 52 and service request success notifications from the switch engine 52 to the CTI application 50, as shown in FIG. 13. FIG. 13 is a diagram for explaining a relationship of API requests and transitions of the call model.

In FIG. 13, (A) shows a case where the CTI application 50 requests a call originating service from the switch engine 52 to a device, with respect to the switch engine 52 by sending a message "ecc Make Trunk Call Req". When a call is originated from the switch engine 52 to the device, a service request success notification from the switch engine 52 to the CTI application 50, that is, a message "ECC Make Trunk Call Rsp", is returned from the switch engine 52 to the CTI application 50. As a result, after the service is completed, the partial call of the call model is generated, and the partial call state makes a transition from the null state prior to the service request to the originated state.

In FIG. 13, (B) shows a case where the CTI application 50 requests a service to release the connection between the switch engine 52 and the device, with respect to the switch engine 52 by sending a message "ecc Clear Trunk Connection Req". When a service request success notification, that is, a message "ECC Clear Trunk Connection Rsp", is returned the CTI application 50 by the switch engine 52 in response to the message "ecc Clear Trunk Connection Req" from the CTI application 50, the connection between the switch engine 52 and the device is released. As a result, the partial call of the call model is nullified after completion of the service, and the partial call state makes a transition to the null state.

In FIG. 13, (C) shows a case where the CTI application 50 requests a service to make a connection between two devices to the switch engine 52, with respect to the switch engine 52 by sending a message "ecc Create Call Bridge Req". When a service request success notification, that is, a message ECC Create Call Bridge Rsp", is returned to the CTI application 50 by the switch engine 52 in response to the message "ecc Create Call Bridge Req" from the CTI application 50, the connection between the two devices is formed. As a result, the cal bridge of the call model is generated, and the call bridge state makes a transition from the bridge null state prior to the service request to the bridge state.

In FIG. 13, (D) shows a case where the CTI application 50 requests a service to release the path connection, with respect to the switch engine 52 by sending a message "ecc Clear Call Bridge Req". When a service request success notification, that is, a message "ECC Clear Call Bridge Rsp", is returned from the switch engine 52 to the CTI application 50 in response to the message "ecc Clear Call Bridge Req" from the CTI application 50, the path connection is released. As a result, the call bridge of the call model is nullified, and the call bridge state makes a transition from the bridge state prior to the service request to the bridge null state.

FIG. 14 is a diagram for explaining a relationship of the call information notification of the call control API 51 and the transition of the call model.

In FIG. 14, (A) shows a case where a call from a device is received by the switch engine 52. In this case, a message "ECC Incoming Call Event" is notified from the switch engine 52 to the CTI application 50. In this state, the partial call is generated in the call model, and the partial call state makes a transition from the null state prior to the call information notification to the initiated state.

In FIG. 14, (B) shows a case where a call is originated from the switch engine 52 to a device. In this case, a message "ECC Outgoing Call Event" is notified from the switch engine 52 to the CTI application 50. In this state, the partial call is generated in the call model, and the partial call state makes a transition from the null state prior to the call information notification to the originated state.

In FIG. 14, (C) shows a case where a device is called. In this case, a message "ECC Delivered Event" is notified from the switch engine 52 to the CTI application 50. In this state, the partial call state of the call model makes a transition from the originated state to the alerting state.

In FIG. 14, (D) shows a case where a device responds. In this case, a message "ECC Established Event" is notified from the switch engine 52 to the CTI application 50. In this state, the partial call state of the call model makes a transition to the connected state.

In FIG. 14, (E) shows a case where a connection between the switch engine 52 and a device fails. In this case, a message "ECC Failed Event" is notified from the switch engine 52 to the CTI application 50. In this state, the partial call state of the call model makes a transition to the failed state.

In FIG. 14, (F) shows a case where a connection between the switch engine 52 and a device is released. In this case, a message "ECC Trunk Connection Cleared Event" is notified from the switch engine 52 to the CTI application 50. In this state, the partial call is nullified in the call model, and the partial call state makes a transition to the null state.

In FIG. 14, (G) shows a case where a path between two devices is connected. In this case, a message "ECC Call Bridge Connected Event" is notified from the switch engine 52 to the CTI application 50. In this state, the call bridge state makes a transition from the bridge null state to the bridge state. In addition, the partial call state makes a transition from the initiated state to the connected state.

In FIG. 14, (H) shows a case where a path between two devices is released. In this case, a message "ECC Call Bridge Disconnected Event" is notified from the switch engine 52 to the CTI application 50. In this state, the call bridge state makes a transition from the bridge state to the bridge null state. As a result, two partial calls remain.

Figure 15:
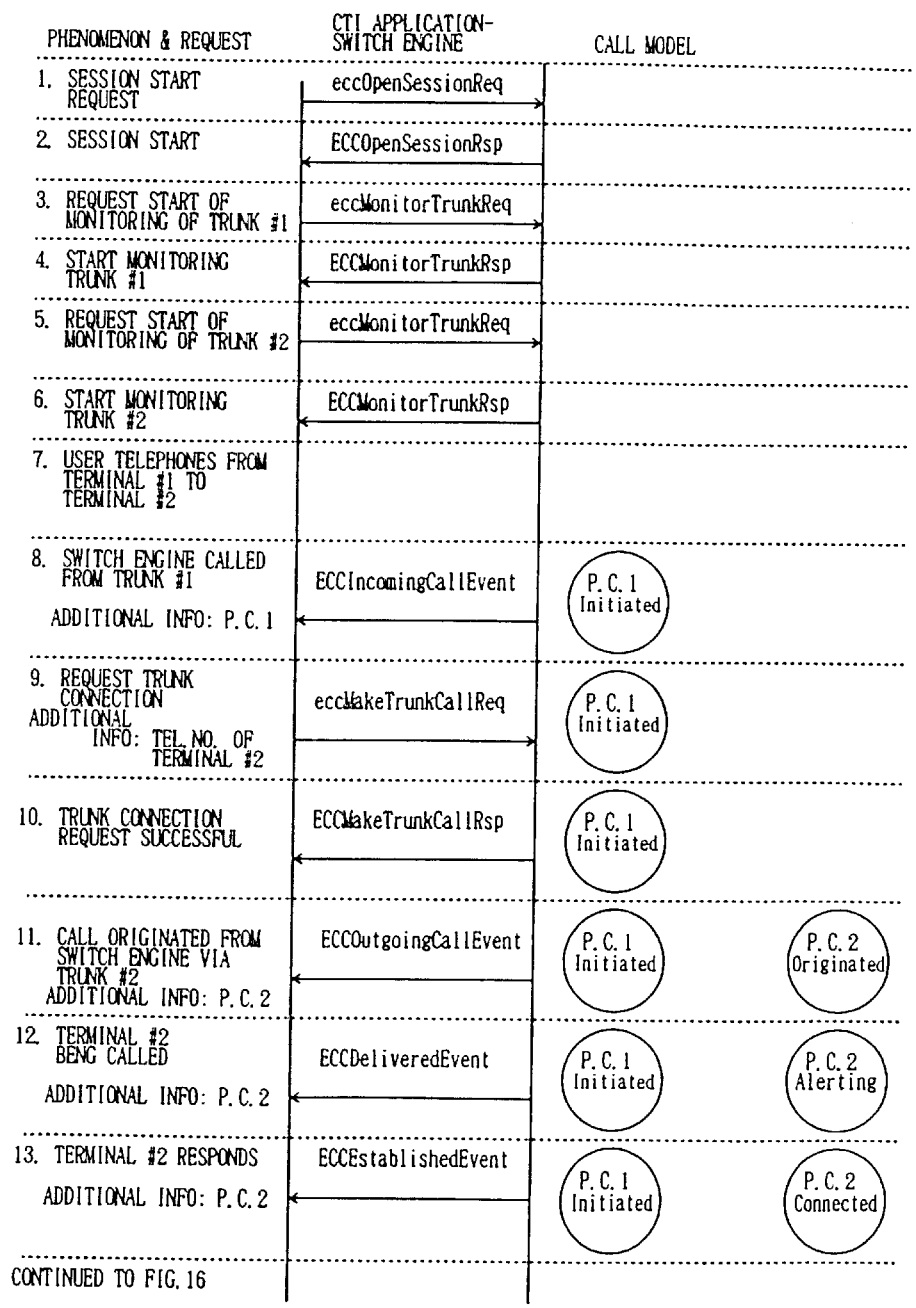
FIG. 15 is a diagram for explaining a message sequence between a CTI application and a switch engine by the call control API.
Figure 16:
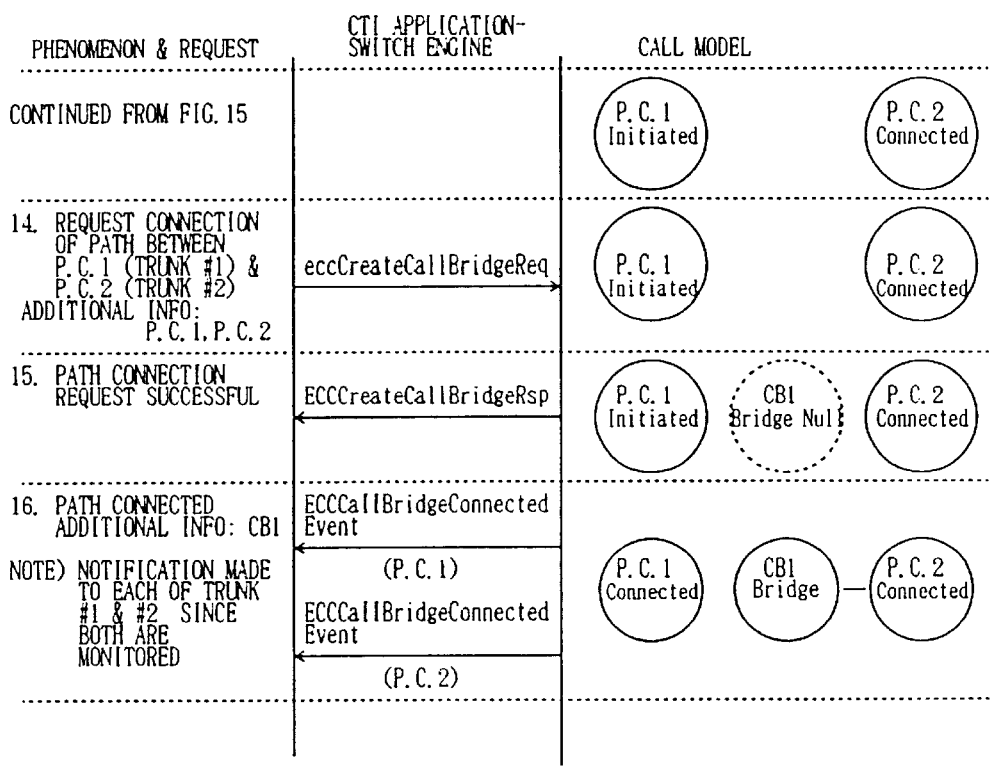
FIG. 16 is a diagram for explaining the message sequence between the CTI application and the switch engine by the call control API.

FIGS. 15 and 16 are diagrams for explaining a message sequence between the CTI application 50 and the switch engine 52 by the call control API 51. More particularly, FIGS. 15 and 16 show the message sequence between the CTI application 50 and the switch engine 52 and the change in the call model, for a case where the telephone terminal (#1) 56 makes a call to the telephone terminal (#2) 57. The message sequence can roughly be divided into the following four kinds of message sequences [1] through [4].

The sequence [1] relates to the establishment of a session between the CTI application 50 and the switch engine 52, and includes advance preparations for making a switching service, as indicated under phenomena and requests 1 through 6 shown in FIG. 15.

The sequence [2] relates to the calling from the telephone terminal (#1) 56 to the switch engine 52, and includes the connection of the switching system and the telephone terminal (#1) 56 in response to the call from the telephone terminal (#1) 56, as indicated under phenomena and requests 7 and 8 shown in FIG. 15.

The sequence [3] relates to the origination of the call from the switch engine 52 to the telephone terminal (#2) 57, and includes the connection of the switching system and the telephone terminal (#2) 57, as indicated under phenomena and requests 9 through 13 shown in FIG. 15.

The sequence [4] relates to the connection of the path between two devices, namely, the telephone terminal (#1) 56 and the telephone terminal (#2) 57, and includes the line connection between the telephone terminal (#1) 56 and the telephone terminal (#2) 57, as indicated under phenomena and requests 14 through 16 shown in FIG. 16.

The Sequence [1]

When establishing a session between the CTI application 50 and the switch engine 52, the CTI application 50 requests a start of a session to the switch engine 52 by sending a message "ecc Open Session Req" which is shown under the phenomenon and request 1 in FIG. 15 and is defined by the call control API 51. A success notification regarding this message "ecc Open Session Req" is returned from the switch engine 52, as shown under the phenomenon and request 2. When the CTI application 50 requests monitoring of a trunk for each trunk by sending a message "ecc Monitor Trunk Req" which is defined by the call control API 51, the switch engine 52 returns a message "ECC Monitor Trunk Rsp", as shown under the phenomena and requests 3 through 6. As a result, when a change occurs in the device which is monitored by the switch engine 52, this phenomenon is notified to the CTI application 50.

The Sequence [2]

When calling the switch engine 52 from the telephone terminal (#1) 56, a user calls from the telephone terminal (#1) 56 to the telephone terminal (#2) 57, as shown under the phenomenon and request 7 in FIG. 15, and the switch engine 52 is called. When the switch engine 52 is called from the trunk (#1) 54, as shown under the phenomenon and request 8, a message "ECC Incoming Call Event" is notified from the switch engine 52 to the CTI application 50. In addition, the switch engine 52 also notifies to the CTI application 50, as additional information, that the partial call PC1 is in the initiated state. In the call model, the partial call PC1 is generated, and the partial call state assumes the initiated state.

The Sequence [3]

When originating a call from the switch engine 52 to the telephone terminal (#2) 57, the CTI application 50 makes a trunk connection request to the switch engine 52 by sending a message "ecc Make Trunk Call Req", as shown under the phenomenon and request 9 in FIG. 15, so that the switch engine 52 originates a call with respect to the telephone terminal (#2) 57. The message "ecc Make Trunk Call Req" includes the telephone number of the telephone terminal (#2) 57 as additional information. The CTI application 50 receives a trunk connection request success notification, as shown under the phenomenon and request 10. Furthermore, when the switch engine 52 originates a call to the telephone terminal (#2) 57 via the trunk (#2) 55, as shown under the phenomenon and request 11, the switch engine 52 notifies a message "ECC Outgoing Event" to the CTI application 50. This message "ECC Outgoing Event" includes additional information indicating that the partial call PC2 is in the originated state. In this state, the partial call PC2 is generated in the call model, and the partial call state assumes the originated state. When the CTI application 50 receives a notification that the telephone terminal (#2) 57 is being called, as shown under the phenomenon and request 12, and receives a notification that the telephone terminal (#2) 57 responded, as shown under the phenomenon and request 13, the partial call state of the partial call PC2 in the call model makes a transition from the alerting state to the connected state.

The Sequence [4]

When connecting a path between two devices such as the telephone terminal (#1) 56 and the telephone terminal (#2) 57, the CTI application 50 requests a connection between the partial call PC1 (trunk (#1) 54) and the partial call PC2 (trunk (#2) 55) by sending a message "ecc Create Call Bridge Req", as shown under the phenomenon and request 14 in FIG. 16. This message "ecc Create Call Bridge Req" includes additional information indicating that the partial call PC1 is in the initiated state and the partial call PC2 is in the connected state. When the CTI application 50 receives a path connection request success notification shown under the phenomenon and request 15 and a notification of a message "ECC Call Bridge Connected Event" which is shown under the phenomenon and request 16 and includes additional information regarding the generation of the call bridge CB1, the call bridge CB1 is generated between the partial call PC1 and the partial call PC2. Hence, the partial call state of the partial call PC1 makes a transition to the connected state, and a service becomes possible between the telephone terminal (#1) 56 and the telephone terminal (#2) 57.

Services of the Present Invention

When the switch engine 52 is called from one device such as the telephone terminal (#1) 56 in this embodiment, the switch engine 52 originates a call with respect to the telephone terminal (#1) 56 which is the destination, based on the service request from the CTI application 50. A service is provided between the telephone terminal (#1) 56 and the telephone terminal (#2) 57 by connecting the path between the two telephone terminals (#1) 56 and (#2) 57. Services which can be provided in the present invention, including this service, will now be described with reference to FIGS. 17 through 22, by making a comparison with the conventional system.

In each of FIGS. 17 through 22, the left side shows the call model of the present invention, and the right side shows a corresponding call model of the conventional system.

According to a service S1 of the present invention, a talkie device driving service is provided as shown on the top left in FIG. 17. In this case, (1—1) only a connection of the device and the switch engine exists.

On the other hand, according to the conventional system, in order to provide the talkie device driving service, (C1-1) the API requires a dummy device, as shown on the top right in FIG. 17. Hence, the conventional API requires the dummy device.

According to a service S2 of the present invention, a joint service is provided wherein the switch engine is called from two devices as shown on the bottom left in FIG. 17. In this case, (2-1) the switch engine is called from the first device, (2—2) the switch engine is called from the second device, and (2-3) the path between the two devices is connected.

On the other hand, according to the conventional system, in order to provide the joint service, (C2-1) the switch engine is called from the first device and the call is generated between the first device and the dummy device, (C2-2) the switch engine is called from the second device, and (C2-3) the transfer is made from the dummy device to the second device, as shown on the bottom right in FIG. 17.

According to a service S3 of the present invention, the service of the first embodiment described above is provided as shown on the top left in FIG. 18. In this case, the first device originates the call and the second device receives the call, and a typical service is provided between the first and second devices. In other words, (3-1) the switch engine is called from the first device, (3-2) the switch engine originates the call to the second device, and (3—3) the path between the first and second devices is connected.

On the other hand, according to the conventional system, in order to provide the service wherein the first device originates the call and the second device receives the call, (C3-1) the switch engine is called from the first device, (C3-2) the switch engine originates the call to the second device, and (C3-3) the call is established between the first and second devices, as shown on the top right in FIG. 18.

According to a service S4 of the present invention, a talkie (guidance) connection service is provided as shown on the bottom left in FIG. 18. In this case, (4-1) the first device is called from the device engine, (4-2) the switch engine is called from the second device, and (4-3) the path between the first and second devices is connected.

On the other hand, according to the conventional system, in order to provide the talkie (guidance) connection service, (C4-1) the switch engine generates the call between the first device and the dummy device, (C4-2) the switch engine is called from the second device, and (C4-3) the transfer is made from the dummy device to the second device, as shown on the bottom right in FIG. 18.

According to a service S5 of the present invention, the connection and the call origination of the switch engine are provided as shown in FIG. 19. In this case, (5-1) the switch engine originates the call to the first device, (5-2) the switch engine originates the call to the second device, and (5-3) the path between the first and second devices is connected.

On the other hand, according to the conventional system, in order to provide the connection and the call origination of the switch engine, (C5-1) the switch engine originates the call to the first device, (C5-2) the switch engine originates the call to the second device, and (C5-3) the call is established between the first and second devices, as shown on the right in FIG. 19.

According to a service S6 of the present invention, the broadcast service is provided as shown in FIG. 20. In this case, (6-1) the connection between the device and the switch engine is established beforehand, (6-2) the call is originated from the switch engine to a plurality of devices, and (6-3) the path between two devices is connected.

On the other hand, according to the conventional system, in order to provide the broadcast service, (C6-1) the switch engine originates the call to the first device, (C6-2) the switch engine requests the conference to a plurality of devices, and (C6-3) the conference among the devices is established, as shown on the right in FIG. 20.

According to a service S7 of the present invention, the call waiting service is provided as shown in FIG. 21. In this case, (7-1) three of more connections are established between the switch engine and the devices beforehand, and the path between two devices is connected, (7-2) the connection of the path is released, and (7-3) the path between one of the two devices released from the path and a third device is connected.

On the other hand, according to the conventional system, in order to provide the call waiting service, (C7-1) the first and second devices are connected and the third device is put in a queued state, (C7-2) the first and second devices are connected and the call is moved from the dummy device to the first device with respect to the third device, and (C7-3) the call is moved from the first device to the dummy device with respect to the second device and the third device is changed from the hold state to the connected state, as shown on the right in FIG. 21. Hence, the procedure of the conventional API is complex.

According to a service S8 of the present invention, the conference service is provided as shown in FIG. 22. In this case, (8-1) a fourth device participates during the conference carried out among three devices, and (8-2) the path of the fourth device is connected to the three devices carrying out the conference.

On the other hand, according to the conventional system, in order to provide the conference service, (C8-1) the fourth device participates during the conference of three devices, and (C8-2) the fourth device is put into the connected state with the other three devices making the conference, as shown on the right in FIG. 22.

Second Embodiment of the Present Invention

Figure 23:
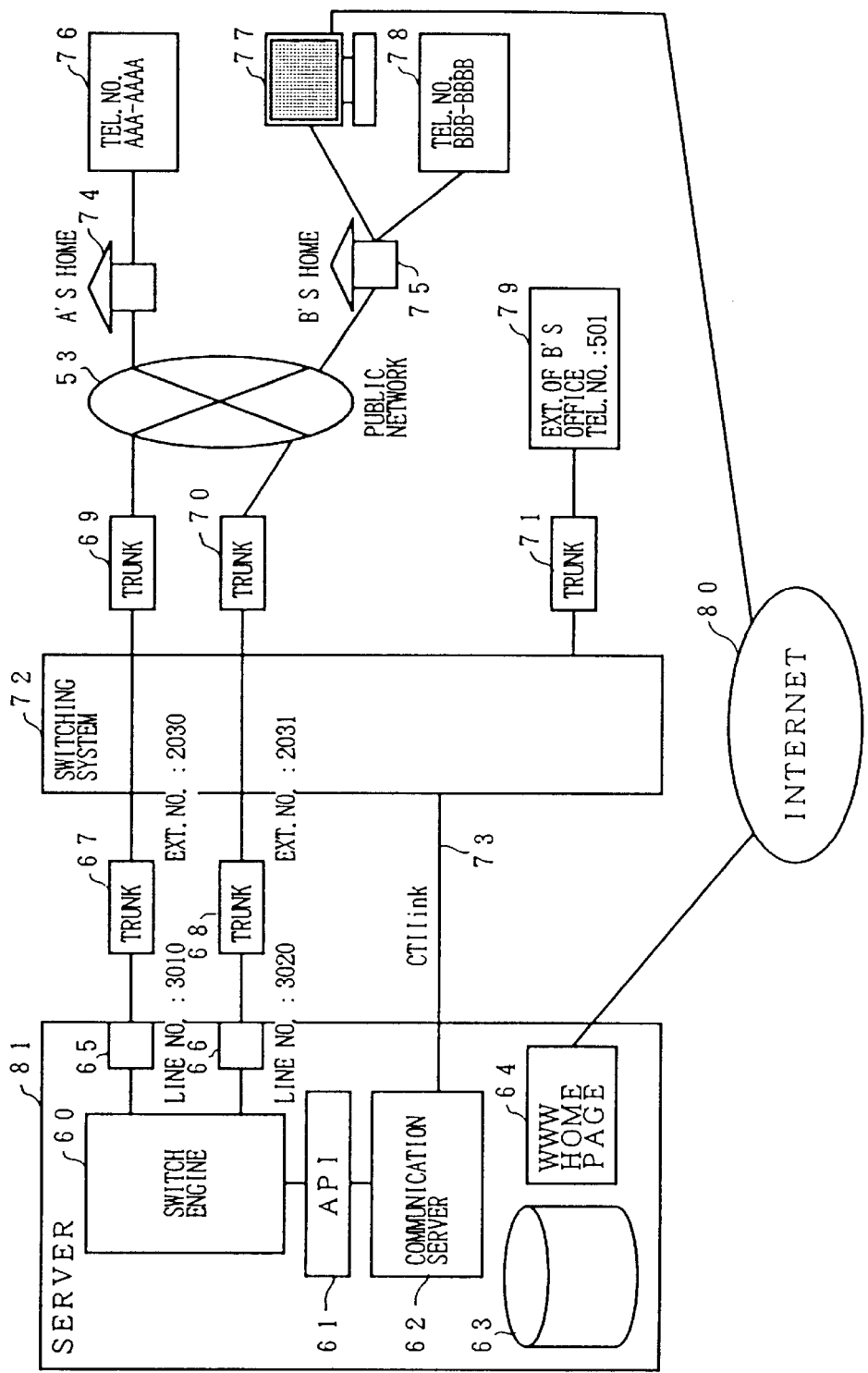
FIG. 23 is a diagram showing the construction of a second embodiment of the computer-telephone integrated system according to the present invention.

FIG. 23 is a diagram showing the construction of a second embodiment of the computer-telephone integrated system according to the present invention. In this embodiment, the computer-telephone integrated system includes a server 81, a switching system 72, trunks 67 through 71, a public network 53, a telephone terminal 76 in a home 74 of a user A, a personal computer 77 and a telephone terminal 78 in a home 75 of a user B, an office telephone terminal 79 of the user B, and an internet 80 which are connected as shown in FIG. 23. The personal computer 77 is a terminal of the internet 80.

The server 81 is formed by a computer, and includes a switch engine 60, input and output terminals 65 and 66 of the switch engine 60, a call control API 61, a communication server 62, a function of controlling a world wide web (WWW) home page 64, and a function of controlling a database 63. The communication server 62 includes the functions of the service request part.

The communication server 62 exchanges switching system information between the switching system 72 via a CTI link 73, and includes the functions of the service request part with repsect to the switch engine 60. The database 63 is accessible from the switch engine 60, the communication server 62 and the WWW home page 64. The switching system 72 and the switch engine 60 are connected in a form such that the trunk of the switch engine 60 is connected to the extension of the switching system 72. In other words, when viewed from the switching system 72, the switch engine 60 corresponds to a terminal connected to the extension of the switching system 72. The call control API 61 between the communication server 62 and the switch engine 60 is the same as the call control API of the first embodiment described above. On the other hand, a call control API between the communication server 62 and the switching system 72 may be the same as the conventional TSAPI.

The user B working at his home 75 can make access to the home page 64 of the server 81 from the personal computer 77 via the internet 80. The CTI link 73 between the server 81 and the switching system 72 is connected by a local area network (LAN) which is used when notifying information from the switching system 72 to the communication server 62 and when making a connection request from the communication server 62 to the switching system 72.

Next, a description will be given of the operation of the computer-telephone integrated system having the construction shown in FIG. 23.

Figure 24:
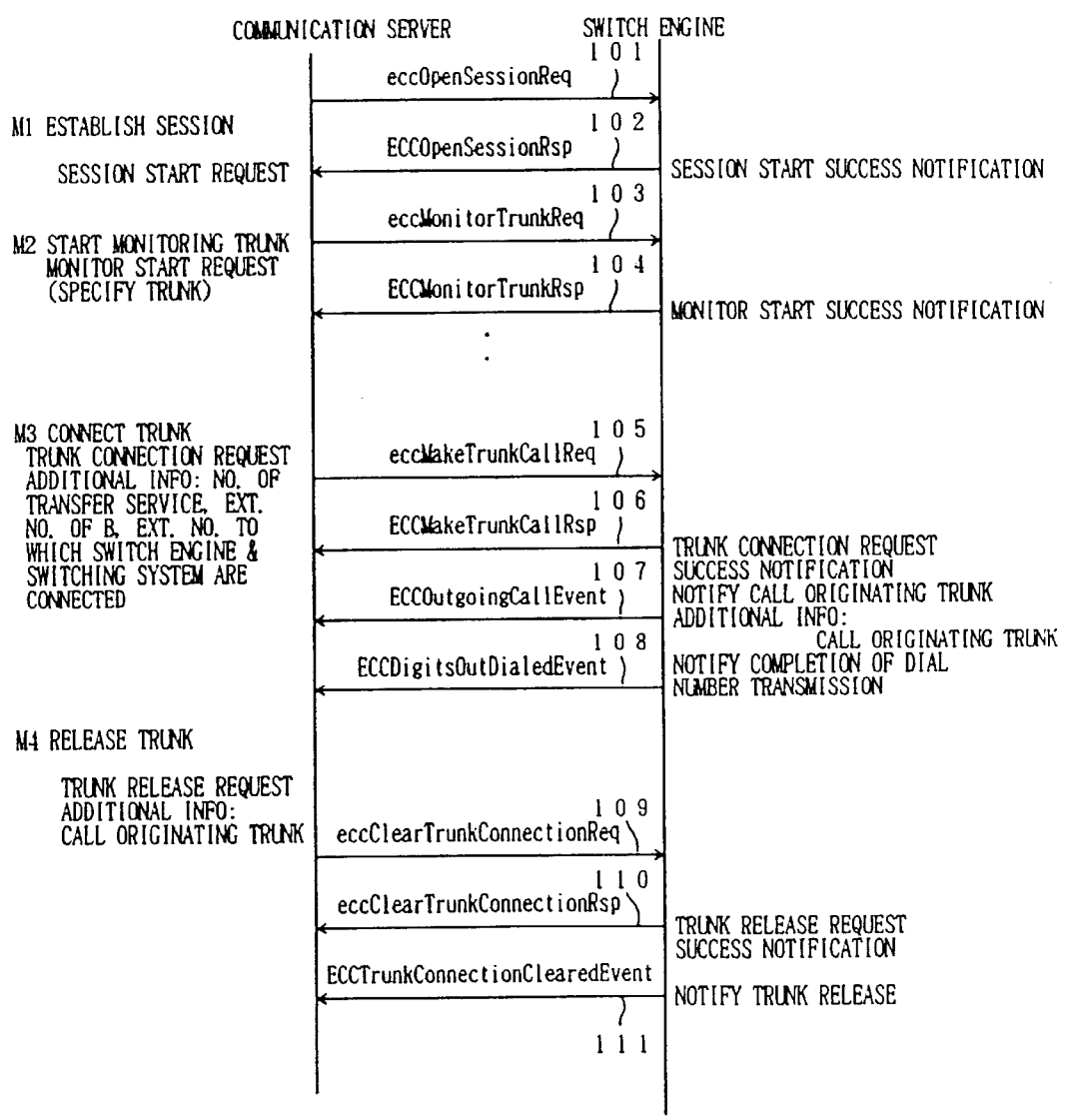
FIG. 24 is a diagram for explaining a message sequence between a communication server and a switch engine in the second embodiment of the computer-telephone integrated system.

FIG. 24 is a diagram for explaining a message sequence of the API between the communication server 62 and the switch engine 60 starting from a session start request until the call received by the extension of the office of the user B is transferred to the switch engine 60. This message sequence can roughly be divided into four sequences M1 through M4, namely, a sequence M1 in which a session between the communication server 62 and the switch engine 60 is established, a sequence M2 in which a monitoring of a trunk starts, a sequence M3 in which a trunk is connected, and a sequence M4 in which a trunk is released.

Sequence M1

When establishing the session between the communication server 62 and the switch engine 60, the communication server 62 first makes a session start request with respect to the switch engine 60 by sending a message "ecc Open Session Req" 101. Responsive to this message "ecc Open Session Req" 101, the switch engine 60 sends to the communication server 62 a message "ECC Open Session Rsp" 102 which indicates success of the session start request. Hence, the session between the communication server 62 and the switch engine 60 is established.

Sequence M2

When starting the monitoring of the trunk, the communication server 62 makes a monitor start request with respect to the switch engine 60, that is, with respect to terminals 65 and 66 respectively corresponding to the trunks 67 and 68 having extension numbers 3010 and 3020 of the switch engine 60, by sending a message "ecc Monitor Trunk Req" 103. When the switch engine 60 receives the monitor start request and starts monitoring the trunk, the switch engine 60 sends to the communication server 62 a message "ECC Monitor Trunk Rsp" 104 which indicates success of the monitor start request.

Sequence M3

When connecting the trunk, the user B makes access to the home page 64 of the server 81, from the personal computer 77 of his home 75 via the internet 80. In this state, the user B inputs his log-in information such as an identification (ID) number and an authentication number. When the home page 64 is accessed, the database 63 is retrieved based on the input log-in information, and the access from the user B is notified to the communication server 62 if the retrieval is successful. Responsive to the notification regarding the access from the user B, the communication server 62 makes a transfer service request and requests the switch engine 60 to transfer the call received by the extension having a telephone number 501 at the office of the user B to the extension which has a telephone number 2030 and is connected to the switch engine 60.

First, the communication server 62 retrieves from the database 63 the extension number 501 of the office of the user B, and makes a trunk connect request to the switch engine 60 so that the switching system 72 originates a call to the trunk 68, by sending a message "ecc Make Trunk Call Req" 105. This message "ecc Make Trunk Call Req" 105 includes, as additional information, the number of the transfer service, the extension number 501 of the office of the user B, and the extension number 2030 to which the switch engine 60 and the switching system 72 are connected. When the trunk connect request is successful, the switch engine 60 sends a message "ECC Make Trunk Call Rsp" 106 to the communication server 62. Then, the switch engine 60 sends a message "ECC Outgoing Event" 107 to the communication server 62 when the trunk 68 originates a call, and the switch engine 60 sends a message "ECC Digits Out Dialed Event" 108 which is defined by the API to the communication server 62 when sending of the dialed number is completed.

The number 3020 of the trunk 68 which originates the call is first notified as the additional information when the message "ECC Outgoing Event" 107 is sent to the communication server 62. At this point in time, the switching system 72 accepts the transfer service request from the switch engine 60, and transfers the call received by the extension of the user B to the extension to which the switch engine 60 and the switching system 72 are connected.

Sequence M4

The trunk is released after the switching system 72 accepts the transfer service request. In other words, when the communication server 62 receives the messages up to a message "ECC Digits Out Dialed Event" 108, the communication server 62 makes a trunk release request with respect to the trunk which originates the call, by sending a message "ecc Clear Trunk Connection Req" 109. The switch engine 60 sends a message "ECC Clear Trunk Connection Rsp" 110 to the communication server 62 when the trunk release request is successful, and the switch engine 60 sends a message "ECC Trunk Connection Cleared Event" 111 to the communication server 62 when the trunk is released. The release of the trunk is therefore completed in the above described manner.

Figure 25:
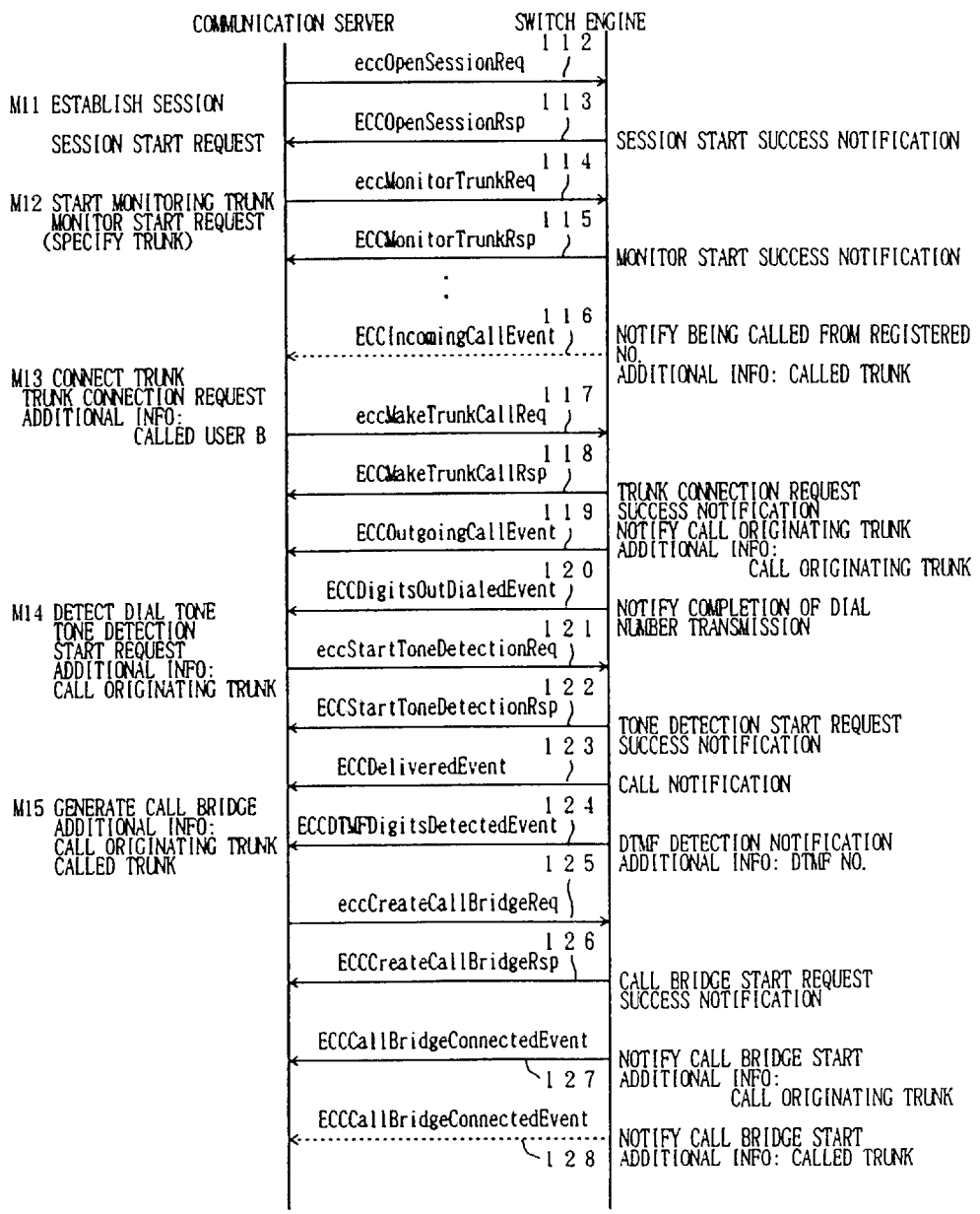
FIG. 25 is a diagram for explaining the message sequence between the communication server and the switch engine in the second embodiment of the computer-telephone integrated system.

FIG. 25 is a diagram for explaining a message sequence of the API between the communication server 62 and the switch engine 60 starting from a session start request until the service is provided between the user A and the user B. This message sequence can roughly be divided into five sequences M11 through M15, namely, a sequence M11 in which a session is established between the communication server 62 and the switch engine 60, a sequence M12 in which a monitoring of the trunk starts, a sequence M13 in which the trunk is connected, a sequence M14 in which a dial tone is detected, and a sequence M15 in which a call bridge is generated.

Sequence M11

When establishing the session between the communication server 62 and the switch engine 60, the communication server 62 makes a session start request with respect to the switch engine 60, by sending a message "ecc Open Session Req" 112. Then, the switch engine 60 sends to the communication server 62 a message "ECC Open Session Rsp" 113 which indicates success of the session start request. As a result, the session is established between the communication server 62 and the switch engine 60.

Sequence M12

When starting the monitoring of the trunk, the communication server 62 makes a monitor start request with respect to the switch engine 60 to monitor the trunks 67 and 68 respectively having the line numbers 3010 and 3020, by sending a message "ecc Monitor Trunk Req" 114. When the switch engine 60 receives the monitor start request and starts monitoring the trunks 67 and 68, the switch engine 60 sends to the communication server 62 a message "ECC Monitor Trunk Rsp" 115 indicating success of the monitor start request.

Sequence M13

When connecting the trunk, the user A at a telephone number AAA-AAAA calls the extension of the switching system 72 in the office of the user B having the telephone number 501. When the user B is working at his office, the switching system 72 calls the extension of his office. However, when the user B is working at his home 75, the switching system 72 provides a transfer service. In other words, when the extension number 501 is called, the switching system 72 transfers the call to the line which is connected to the switch engine 60, that is, to the trunk 67 having the extension number 2030 in the switching system 72 shown in FIG. 23. When the switch engine 60 is called, the switch engine 60 sends a message "ECC Incoming Call Event" 116 to the communication server 62.

When the communication server 62 receives the received telephone number 501 from the switching system 72 via the CTI link after receiving the message "ECC Incoming Call Event" 116, the communication server 62 makes a reference to the database 63 using the received telephone number 501 so as to retrieve the home telephone number BBB-BBBB of the user B. Furthermore, the communication server 62 makes a trunk connection request with respect to the switch engine 60 so as to request a call to the home 75 of the user B, by sending a message "ecc Make Trunk Call Req" 117 to the switch engine 60. When the trunk connection request is successful, the switch engine 60 sends a message "ECC Make Trunk Call Rsp" 118 to the communication server 62. In addition, the switch engine 60 sends a message "ECC Outgoing Event" 119 to the communication server 62 when the trunk originates the call, and the switch engine 60 sends a message "ECC Digits Out Dialed Event" 120 to the communication server 62 when sending of the dialed number is completed.

Sequence M14

When detecting the dial tone, the communication server 62 makes a tone detection start request with respect to the trunk which originates a call when messages up to a message "ECC Digits Out Dialed Event" 120 are received, by sending a message "ecc Start Tone Detection Req" 121 which is defined by the API. When the tone detection is successful, the switch engine 60 sends a message "ECC Start Tone Detection Rsp" 122 which is defined by the API to the communication server 62. In addition, the switch engine 60 sends a message "ECC Delivered Event" 123 to the communication server 62, so as to notify the calling of the trunk which originates the call.

In this state, the function of the server 81 controlling the home page 64 receives called information and call originating number information from the communication server 62, and carries out ringing and display of the call originating number via the home page 64, with respect to the communication server 62 which accesses the home page 64. The user B decides whether or not to talk with the user A, after responding to the call from the switch engine 60 by the telephone terminal 78 at the home 75 of the user B, by sending a dual tone multi frequency (DTMF) signal. In this embodiment, the user B notifies the switch engine 60 of his intention to talk with the user A by pushing a number key "1", for example, so that a DTMF signal indicating the number "1" is sent to the switch engine 60. When the switch engine 60 detects the DTMF signal, the switch engine 60 sends a message "ECC TDMF Digits Detected Event" 124 which is defined by the API to the communication server 62 together with additional information which indicates the DTMF number indicated by the DTMF signal.

Sequence M15

When generating the call bridge, the communication server 62 and the switch engine 60 operate as follows. In this case, the additional information included in the message "ECC DTMF Digits Detected Event" 124 received from the switch engine 60 indicates that the DTMF number indicated by the DTMF signal is "1", that is, that the user B wishes to talk with the user A. Hence, in response to this message "ECC DTMF Digits Detected Event" 124, the communication server 62 makes a call bridge start request by sending a message "ecc Create Call Bridge Req" 125 to the switch engine 60, so as to connect the received trunk from the user A and the call originating trunk to the user B. When the call bridge start request is successful, the switch engine 60 sends a message "ECC Create Call Bridge Rsp" 126 to the communication server 62. In addition, the switch engine 60 sends messages "ECC Call Bridge Connected Event" 127 and 128 to the communication server 62, that is, with respect to two trunks, when the call bridge is started and the two trunks are connected. When the message "ECC Call Bridge Connected Event" 127 is sent to the call originating trunk, the function of the server 81 controlling the home page 64 receives from the communication server 62 information regarding the connection of the two trunks, and makes a display of information indicating that a connection is desired via the home page 64. Furthermore, the service between the user A and the user B becomes possible at the time when the message "ECC Call Bridge Connected Event" 128 is sent to the called trunk.

Third Embodiment of the Present Invention

Figure 26:
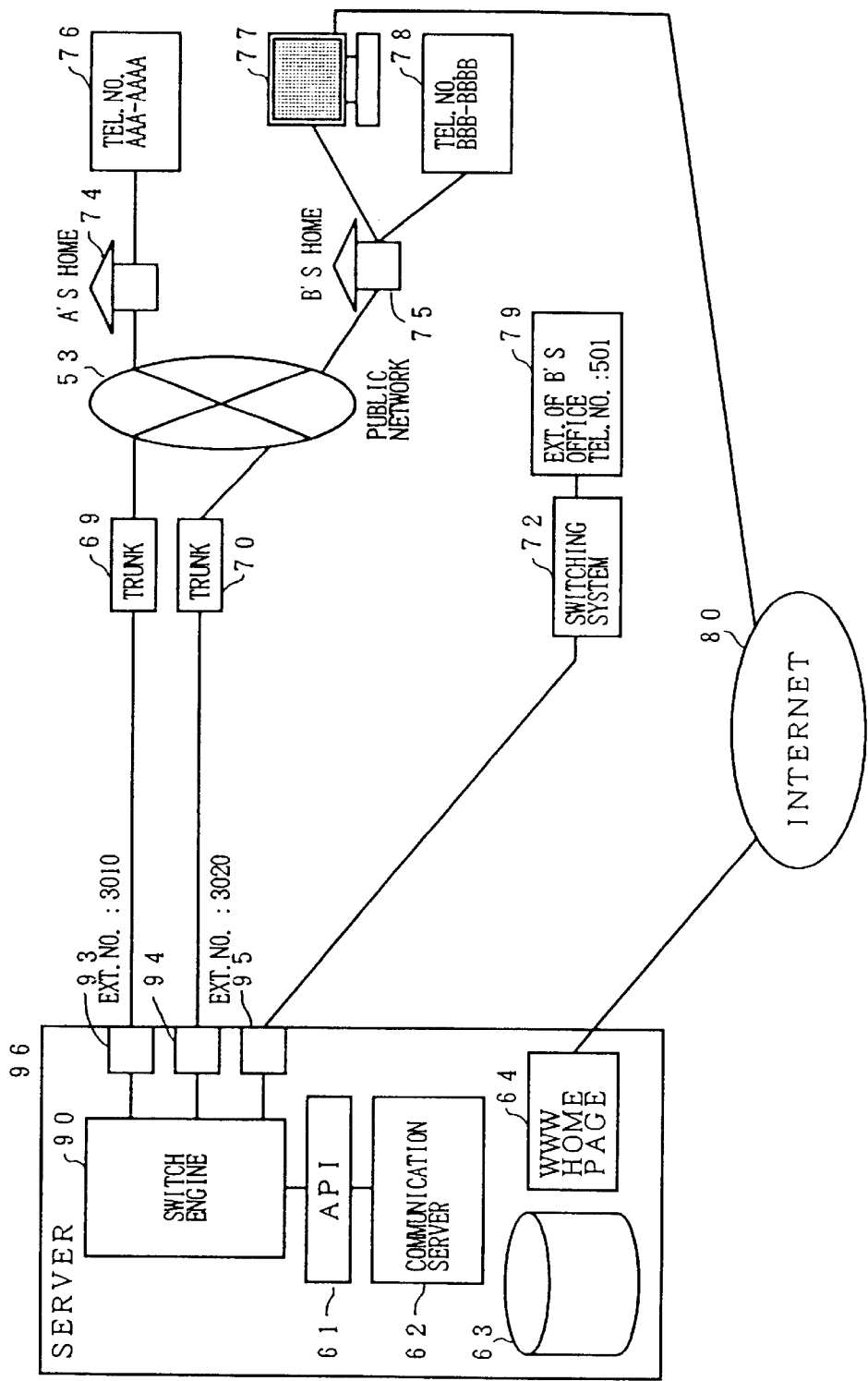
FIG. 26 is a diagram showing the construction of a third embodiment of the computer-telephone integrated system according to the present invention.

Next, a description will be given of a third embodiment of the computer-telephone integrated system according to the present invention. This third embodiment can realize the services realized by the second embodiment described above, using the construction shown in FIG. 26. FIG. 26 is a diagram showing the construction of the third embodiment of the computer-telephone integrated system. In FIG. 26, those parts which are the same as those corresponding parts in FIG. 23 are designated by the same reference numerals, and a description thereof will be omitted.

In this third embodiment, a switch engine 90 within a server 96 shown in FIG. 26 completely accommodates the functions of the switching system 72 shown in FIG. 23. Hence, the switch engine 90 is directly connected to the telephone terminal 76 in the home 74 of the user A, the telephone terminal 78 in the home 75 of the user B, the office telephone terminal 79 in the office of the user B and the like, without having a switching system interposed between the switch engine 90 and the telephone terminals 76, 78 and 79. More particularly, terminals 93 and 94 are respectively connected to the trunks 69 and 70, and a terminal 95 is connected to the office telephone terminal 79 via the switching system 72.

In this case, the switch engine 90 includes the functions of the switching system 72, and also carries out processes such as controlling not only the trunks but also the extensions. Since all of the switching functions are integrated in the switch engine 90, it is unnecessary to make a transfer to the switch engine 90 when the office telephone terminal 79 in the office of the user B is called from the user A, although such a transfer to the switch engine 60 is necessary in the second embodiment shown in FIG. 23. Hence, the service indicated by the sequences shown in FIG. 24 is unnecessary in the third embodiment.

Fourth Embodiment of the Present Invention

Figure 27:
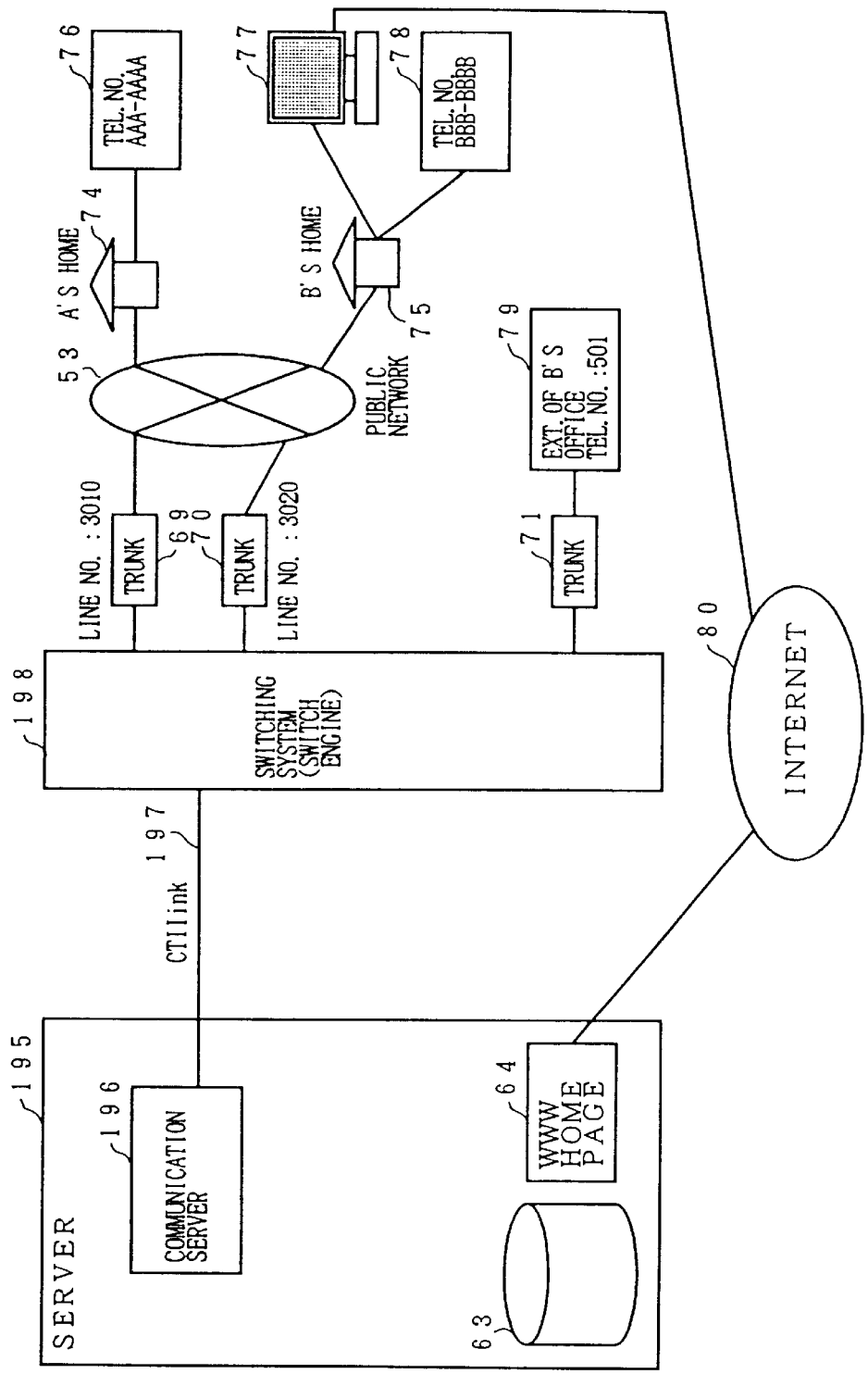
FIG. 27 is a diagram showing the construction of a fourth embodiment of the computer-telephone integrated system according to the present invention.

Next, a description will be given of a fourth embodiment of the computer-telephone integrated system according to the present invention. This fourth embodiment can realize the services realized by the second embodiment described above, using the construction shown in FIG. 27. FIG. 27 is a diagram showing the construction of the fourth embodiment of the computer-telephone integrated system. In FIG. 27, those parts which are the same as those corresponding parts in FIG. 23 are designated by the same reference numerals, and a description thereof will be omitted.

In this fourth embodiment, a switch engine is provided outside a server 195, and a switching system 198 is used as the switch engine. A communication server 196 within the server 195 is connected to this switching system 198 via a CTI link 197.

Of course, the switch engine provided outside the server 195 is not limited to the switching system 198, and the switch engine may be provided in a computer different from the computer which forms the server 195. In this case, the API communication between the communication server 196 and the switch engine is not carried out within one computer, but is carried out using a network such as a LAN.

In this fourth embodiment, the functions of the switching system 198 are integrated in the switch engine provided outside the server 195, the service indicated by the sequences shown in FIG. 24 is also unnecessary in the fourth embodiment.

Next, a description will be given of a computer system capable of realizing the functions of the server, including the communication server and the switch engine, and/or the switching system, that is, capable of realizing the functions of a switching control apparatus adapted to the computer-telephone integrated system, by referring to FIGS. 28 and 29.

Figure 28:
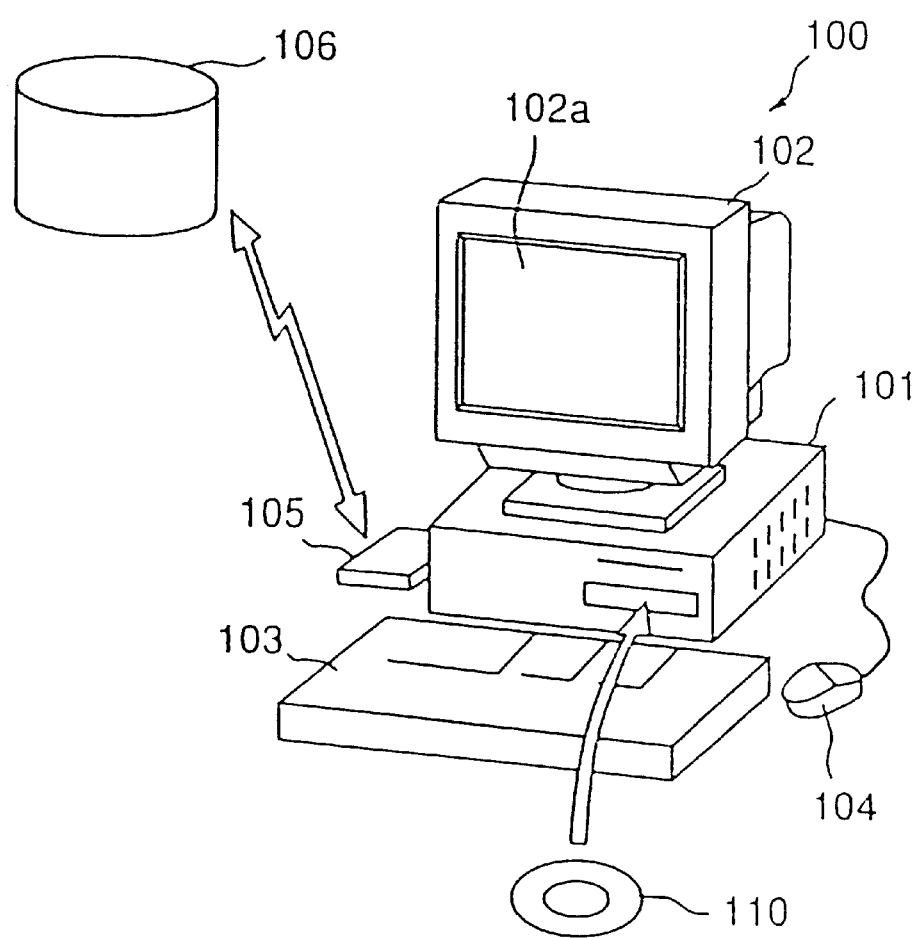
FIG. 28 is a perspective view showing a computer system capable of realizing the embodiments of the computer-telephone integrated system.

FIG. 28 is a perspective view showing a computer system capable of realizing the embodiments of the computer-telephone integrated system described above.

A computer system 100 shown in FIG. 28 is made of a general purpose computer system such as a personal computer. The computer system 100 generally includes a main body part 101 which is provided with a CPU, a disk drive and the like, a display 102 which displays an image on a display screen 102a in response to an instruction from the main body part 101, a keyboard 103 which is used to input various information to the computer system 100, a mouse 104 which specifies an arbitrary position on the display screen 102a of the display 102, and a modem 105 which downloads a program or the like stored in another computer system by accessing an external database or the like. A program which is stored in a portable recording medium such as a disk 110 or is downloaded from a recording medium 106 of another computer system using a communication unit such as the modem 105 is input to and compiled in the computer system 100.

Figure 29:
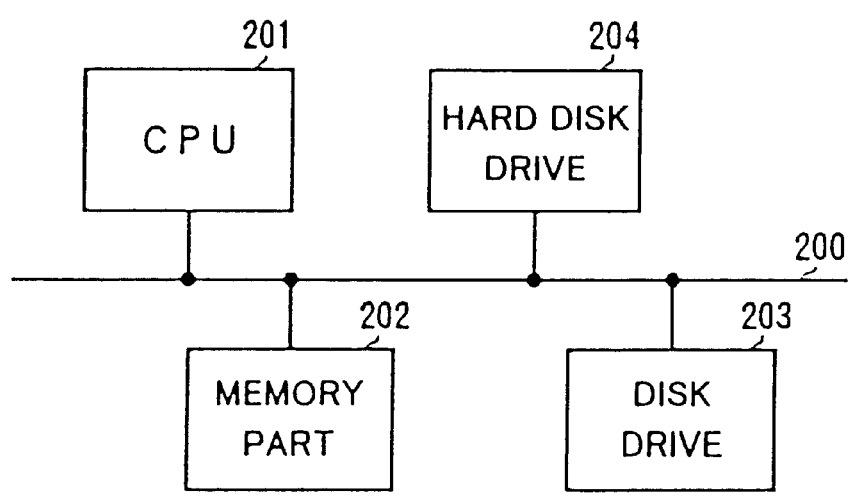
FIG. 29 is a system block diagram showing the construction of a main body part of the computer system shown in FIG. 28.

FIG. 29 is a system block diagram showing the construction of an important part within the main body part 101 of the computer system 100. The main body part 101 shown in FIG. 28 generally includes a CPU 201, a memory part 202 which is made up of a RAM, ROM and the like, a disk drive 203 for the disk 110, and a hard disk drive 204 which are coupled via a bus 200. The CPU 201 controls the general operation of the computer system 100. For example, a hard disk within the hard disk drive 204 stores a program to be executed by the CPU 201, and the memory part 202 and a floppy disk within the disk drive 203 stores data including intermediate data of operations carried out by the CPU 201.

Of course, the construction of the computer system 100 is not limited to that shown in FIGS. 28 and 29, and any known construction may be used for the computer system 100.

An embodiment of a storage medium according to the present invention stores a program for causing a computer such as the CPU 201 described above to carry out the functions of the server, including the communication server and the switch engine, and/or the switching system. The storage medium is formed by the disk 110, for example. However, the type of recording medium forming the storage medium is not limited to the disk 110, and various types of recording mediums can be used as the storage medium. The various types of recording mediums usable as the storage medium of the present invention include disks such as magnetic disks, optical disks, magneto-optical disks and CD-ROMs, magnetic and optical memory cards, and semiconductor memory devices such as ROMs.

Therefore, according to the present invention, it is possible to carry out a control in units of devices, independently of a connected state of a path, when controlling a call of a switch engine by a service request part, that is, a CTI application.

In addition, the service request part, that is, the CTI application, can provide various switching services solely by four functions (i) through (iv) of a call control API, namely, (i) the function of originating a call to a device, (ii) the function of releasing a connection between a switch engine and a device, (iii) the function of connecting a path between two devices, and (iv) the function of releasing a connection of a path between two devices.

Further, the present invention is not limited to these embodiments, but various variations and modifications may be made without departing from the scope of the present invention.

What is claimed is:

1. A computer-telephone integrated system, comprising:

a switch engine to carry out a switching control;

devices, including a plurality of trunks, coupled to said switch engine;

a service request part to request a telephone switching service with respect to said switch engine; and service request process/call information notifying means for providing an interface function between said switch engine and said service request part;

said service request process/call information notifying means processing a switching service request from said service request part to said switch engine, and notifying call information related to said devices, and a connection of a path from said switch engine to said service request part, and said call information including information related to states of said devices and information related to a connection of a path between said devices;

wherein said service request process/call information notifying means controls said switch engine to connect an arbitrary one of said plurality of trunks to at least another one of said plurality of trunks via said switch engine without telephone intervention.

2. The computer-telephone integrated system as claimed in claim 1, wherein:

a call is established independently of a connection of a path between said devices; and a service in provided in units of said devices, based on a service request from said service request part.

3. The computer-telephone integrated system as claimed in claim 1, wherein:

a path between two devices is connected based on a service request from said service request part when said switch engine is called from the two devices.

4. The computer-telephone integrated system as claimed in claim 1, wherein:

said switch engine originates a call to a second one of said devices based on a service request from said service request part when said switch engine is called from a first one of said devices, so as to connect a path between said first device and said second device.

5. The computer-telephone integrated system as claimed in claim 1, wherein:

when said switch engine is called from a second one of said devices after originating a call from said switch engine to a first one of said devices, said switch engine connects a path between said first device and said second device based on a service request from said service request part.

6. The computer-telephone integrated system as claimed in claim 1, wherein:

said switch engine independently originates a call to two of said devices based on a service request from said service request part, and connects a path between said two devices.

7. The computer-telephone integrated system as claimed in claim 1, wherein:

after establishing a call to a first one of said devices, said switch engine simultaneously originates a call to said devices based on a service request from said service request part and connects a path between said first device and one of said devices which responds, so as to provide a broadcast service.

8. The computer-telephone integrated system as claimed in claim 1, wherein:

in a state where a call to three or more of said devices is established and a path is connected between first and second devices among the three or more devices, said switch engine releases the path between the first and second devices based on a service request from said service request part, and switches a connection of a path by connecting a path between one of the first and second devices and a third device having an established connection to said switch engine.

9. The computer-telephone integrated system as claimed in claim 1, wherein:

said switch engine carries out a conference based on a service request from said service request part by originating a call to a first one of said devices which is to make the conference, connecting a path between said first device and a second one of said devices to participate in the conference with a third one of said devices, originating a call from said switch engine to said third device or by being called from said third device, and connecting a path between said third device and said second device.

10. A computer-readable storage medium which stores a program for causing a computer to carry out a switching control, said program comprising:

first means for causing the computer to process a service request from a service request part requesting a telephone switching service with respect to a switch engine which carries out a switching control; and second means for causing the computer to notify to the service request part information related to states of devices including a plurality of trunks coupled to the switch engine and information related to a connection of a path between the devices;

wherein said second means causes the computer to control the switch engine so as to connect an arbitrary one of the plurality of trunks to at least another one of the plurality of trunks via the switch engine without telephone intervention.

11. The computer-readable storage medium as claimed in claim 10, wherein said first means includes:

means for causing the computer to originate a call to the devices;

means for causing the computer to release a connection between the switch engine and the devices;

means for causing the computer to connect a path between two of the devices; and means for causing the computer to release a connection of a path between two of the devices.

12. A switching control apparatus comprising:

a switch engine to carry out a switching control;

a service request part to request a telephone switching service with respect to said switch engine; and service request process/call information notifying means for providing an interface function between said switch engine and said service request part, said service request process/call information notifying means processing a switching service request from said service request part to said switch engine, and notifying call information related to devices including a plurality of trunks and a connection of a path from said switch engine to said service request part, said call information including information related to states of the devices and information related to a connection of a path between the devices;

wherein said service request process/call information notifying means controls the switch engine to connect an arbitrary one of the plurality of trunks to at least another one of the plurality of trunks via the switch engine without telephone intervention.

13. The switching control apparatus as claimed in claim 12, wherein:

said switch engine originates a call to a second one of said devices based on a service request from said service request part when said switch engine is called from a first one of said devices, so as to connect a path between said first device and said second device.

14. The switching control apparatus as claimed in claim 12, wherein:

when said switch engine is called from a second one of said devices after originating a call from said switch engine to a first one of said devices, said switch engine connects a path between said first device and said second device based on a service request from said service request part.

15. The switching control apparatus as claimed in claim 12, wherein:
said switch engine independently originates a call to two of said devices based on a service request from said service request part, and connects a path between said two devices.

16. The switching control apparatus as claimed in claim 12, wherein:
after establishing a call to a first one of said devices, said switch engine simultaneously originates a call to said devices based on a service request from said service request part and connects a path between said first device and one of said devices which responds, so as to provide a broadcast service.

17. The switching control apparatus as claimed in claim 12, wherein:
in a state where a call to three or more of said devices is established and a path is connected between first and second devices among the three or more devices, said switch engine releases the path between the first and second devices based on a service request from said service request part, and switched a connection of a path by connecting a path between one of the first and second devices and a third device having an established connection to said switch engine.

18. Th switching control apparatus as claimed in claim 12, wherein:
said switch engine carries out a conference based on a service from said service request part by originating a call to a first one of said devices which is to male the conference, connecting a path between said first device and a second one of said devices to participate in the conference with a third one of said devices, and connecting a path between said third device and said second device.

* * * * *